United States Patent
Agrawal

(10) Patent No.: US 9,332,315 B2
(45) Date of Patent: May 3, 2016

(54) TIMESTAMPED COMMENTARY SYSTEM FOR VIDEO CONTENT

(71) Applicant: Comment Bubble, Inc., Fremont, CA (US)

(72) Inventor: Vivek Agrawal, Fremont, CA (US)

(73) Assignee: Comment Bubble, Inc., Fremont, CA (US)

( * ) Notice: Subject to any disclaimer, the term of this patent is extended or adjusted under 35 U.S.C. 154(b) by 0 days.

(21) Appl. No.: 14/430,537

(22) PCT Filed: Sep. 20, 2013

(86) PCT No.: PCT/US2013/060875
§ 371 (c)(1),
(2) Date: Mar. 23, 2015

(87) PCT Pub. No.: WO2014/047425
PCT Pub. Date: Mar. 27, 2014

(65) Prior Publication Data
US 2015/0245097 A1    Aug. 27, 2015

Related U.S. Application Data

(60) Provisional application No. 61/704,178, filed on Sep. 21, 2012.

(51) Int. Cl.
*H04N 21/475*    (2011.01)
*G06F 3/0484*    (2013.01)
(Continued)

(52) U.S. Cl.
CPC .......... *H04N 21/4756* (2013.01); *G06F 3/0484* (2013.01); *H04N 21/252* (2013.01);
(Continued)

(58) Field of Classification Search
CPC . H04N 21/252; H04N 21/431; H04N 21/472; H04N 21/47205; H04N 21/4788
See application file for complete search history.

(56) References Cited

U.S. PATENT DOCUMENTS 8,402,357 B1 * 3/2013 Norwood ............ G06F 17/2247
715/202
8,819,719 B1   8/2014 Chen et al.
(Continued)

FOREIGN PATENT DOCUMENTS

| EP | 2129120 A1 | 12/2009 |
|----|-----------|---------|
| JP | 2005-223534 | 8/2005 |
| WO | WO2011/088080 A2 | 7/2011 |

OTHER PUBLICATIONS

"Smartercookie" product information for SmarterCookie 1106 Bush Street, #205 San Francisco, CA 94109 available at https://www.beasmartercookie.com, content downloaded Sep. 20, 2013, 6 pages.
(Continued)

*Primary Examiner* — John Schnurr
(74) *Attorney, Agent, or Firm* — Kilpatrick Townsend & Stockton LLP

(57) ABSTRACT

A video commentary system receives video content items from users in a community. Such video content items are presented to viewers in the community. The system presents submission controls through which the viewers can submit feedback related to specific time points within that presentation. The controls can be used to submit textual, video, or audio comments. The controls can include labeled buttons that viewers can activate to submit categorized comments. Each submission is associated with a timestamp corresponding to the current video frame. The user interface includes regions that display, in real-time, the submissions received from the viewers. Submissions can indicate their timestamps. A bar graph indicates, by category and by time interval, quantities of categorized comments that have been received relating to various time intervals in the presentation.

20 Claims, 7 Drawing Sheets

(51) Int. Cl.
  *H04N 21/25* (2011.01)
  *H04N 21/2743* (2011.01)
  *H04N 21/442* (2011.01)
  *H04N 21/4788* (2011.01)
  *H04N 21/658* (2011.01)
  *H04N 21/8547* (2011.01)
  *H04N 21/431* (2011.01)

(52) U.S. Cl.
  CPC ....... *H04N21/2743* (2013.01); *H04N 21/4312* (2013.01); *H04N 21/44222* (2013.01); *H04N 21/4788* (2013.01); *H04N 21/6582* (2013.01); *H04N 21/8547* (2013.01)

(56) References Cited

U.S. PATENT DOCUMENTS

| | | |
|---|---|---|
| 2004/0098754 A1 | 5/2004 | Vella et al. |
| 2007/0245243 A1* | 10/2007 | Lanza .............. G06F 17/30817 715/723 |
| 2008/0086742 A1 | 4/2008 | Aldrey et al. |
| 2009/0193032 A1 | 7/2009 | Pyper |
| 2009/0293079 A1 | 11/2009 | McKee et al. |
| 2011/0113440 A1 | 5/2011 | Roberts |
| 2012/0174032 A1 | 7/2012 | Greene et al. |
| 2013/0117378 A1 | 5/2013 | Kotorov |
| 2014/0115621 A1 | 4/2014 | Karam |

OTHER PUBLICATIONS

International Search Report for patent application PCT/US2013/060875 (Dec. 17, 2013).

* cited by examiner

Comment Bubble  Home  About  Contact                                    vivek2 ▾ | Upload New Video |

Change Video Settings

302 — Video Title          | Clap It Up (Step Up Parody) |

304 — Video Description    | SUBSCRIBE to Above Average
                             Network: http://bit.ly/LIHUTM |
                           100 characters max.

306 — Visibility           ● Private (anyone with link)
                           ○ Public (searchable by others)

308 — Comment Types Allowed  ☑ Textual
                             ☑ Quick
                             ☐ A/V 310 — Video Tags           | Enter tags... |
                           e.g.: dog, jump, circus 312 — Quick Comments       | Enter upto 5... |
                           e.g.: Funny; Thumbs down: Nice try 314 — | Save |  | Cancel |

FIG. 3

Comment Bubble   Home   About   Contact                                vivek2▾   Upload New Video vivek2's Videos edit

Steve Jobs Introduces Original iPhone - Macworld SF (2007)

Steve Jobs masterfully choreographed introduction of iPhone is the biggest event in consumer electronic's history. HIGHLIGHTS: 00:00. Update on Apple (Intel, Retail, Get a Mac ad, iPod, iTunes) 09:45. iPod TV ads 11:40. Apple TV introduction & demo 21:10. iPhone introduction 25:55. iPhone overview (UI, OS X, Design) 35:30. iPhone demo (iPod) 42:04. iPhone demo (Phone, Visual voice-mail, SMS, Photo) 54:35. iPhone demo (Mail, Safari, Widgets, Google Maps) 1:09:45. Partners (Google / Eric Schmidt, Yahoo / Jerry Yang) 1:16:29. iPhone demo 1:20:10. iPhone accessories 1:23:57. iPhone pricing 1:26:53. Cingular & AT&T Partnership 1:36:56. Apple Inc. Date: January 9, 2007 Location: Moscone Convention Center, San Francisco Steve was 51 years old. More Insanely Great Videos & Info at http://everystevejobsvideo.com

402

Clap It Up (Step Up Parody)

SUBSCRIBE to Above Average Network: http://bit.ly/LIHUTM Like us on FACEBOOK: http://on.fo.me/MfBtki Follow us on TWITTER @AboveAverage: http://bit.ly/XFIEe3 Created by Serious Lunch: Tim Bierbaum Billy Keenly John Milhiser Anthony Miale Robert Officer Produced by Celeste Ballard Written by John Milhiser Starring Madeline Waiter, John Milhiser, Twink Caplan, Marcia Gay Harden, Melanie Hutsell, Jim O'Heir, Jacob Pitts, Marcy Jarreau, Mary Holland, Jen Bartels, Shelby Rabara, Linzie Gray, Josh Simpson, karan Sonyy, Nicole Byer, D'Arcy Carden, Maya Ferrara, Andree Vermeuien, Alison Rich, Phoebe Neidhardt, Niketa Calame, Meryl Hathaway, Grace Parra, Joseph Porter, Lesie Korein, Steve Sziaga, Armand Vasquez, Deviyn Coorigan, and Madd Chadd Edited by John Milhiser Music by Jingle Punks Make Up by Meryl Hathaway Choreography by Shelby Rabara Photos by Michael Stoll DP- Nick Ross Sound and Lighting- Tom Murphy Titles- Tim Bierbaum Directed by John Milhiser

TIMESTAMPED COMMENTARY SYSTEM FOR VIDEO CONTENT

CLAIM OF PRIORITY

The present application claims priority under 35 U.S.C. §119(e) to U.S. Provisional Patent Application Ser. No. 61704,178, filed Sep. 21, 2012, and titled "COMPUTER PROGRAM PRODUCT, SYSTEM, AND METHOD FOR USERS TO SHARE COMMENT ABOUT A VIDEOS CONTENT." The entire contents of U.S. Provisional Patent Application Ser. No. 61704,178 are incorporated by reference herein for all purposes.

FIELD OF THE INVENTION

The present application relates to the fields of on-line video storage, presentation, and annotation.

BACKGROUND

People serious about their craft are typically interested in improving their presentations, especially when that craft involves communication with others. For example, a comedian might be interested in improving his comedic routine. He may be interested in making his routine as enjoyable as possible for his audience. For this purpose, some performers seek critique of their performances from others. For example, a performer might invite people to come and watch his performance (possibly at no charge) in order to receive valuable feedback from those people. Using the feedback, the performer might seek to customize his future performances.

However, seeking such "test audiences" can be time-consuming. Performing live in front of people who are present in an audience specifically for the purpose of offering criticism, even if constructive, can sometimes be nerve-wracking. The venues at which such test performances are presented are unlikely to be available to the performer for free. Numerous difficulties attend the approaches that performers have sometimes used in the past in an attempt to hone their skills.

Often, performances are audio-visual in nature. Theoretically, a performer might make a recording of his performance and send that recording to his friends or others who might be willing to watch and offer feedback. Unfortunately, the channels for receiving feedback relative to such recorded presentations are not well developed. Often, even if the performer does receive feedback, such feedback often will not be of the kind in which the performer was really interested. Furthermore, it can be difficult sometimes for the performer to ascertain the specific portions of his performance to which various criticisms apply. All of these factors can combine to make the presentation and feedback process rather ineffective.

SUMMARY

An on-line video commentary system receives video content items from various users in an on-line community. The system presents such video content items as video presentations to various other users in the community. Along with each such video presentation, the system presents submission controls through which the other users can submit feedback related to specific time points within that presentation. The submission controls can include controls for submitting textual, video, audio, or drawing comments. The submission controls can include buttons labeled as desired by the video presentation provider. Such buttons can be activated by the various other users to submit categorized comments quickly. The system can associate each submission with a timestamp that corresponds to the currently playing video frame. In addition to the submission controls, the user interface can include regions that display, in real-time, the submissions received from others in the community. At least sonic of the submissions can indicate the timestamps for those submissions. One such region can contain a bar graph that indicates, by category and by time interval, quantities of categorized comments that have been received relating to various time intervals in the presentation.

BRIEF DESCRIPTION OF THE DRAWINGS

FIG. 3 is a diagram illustrating an example of a video attribute specification user interface that includes controls for specifying various attributes of video content that has been introduced into the timestamped commentary system, according to an embodiment of the invention.

FIG. 4 is a diagram illustrating an example of a video collection user interface that lists video presentations that a particular user has introduced into the timestamped commentary system, according to an embodiment of the invention.

DETAILED DESCRIPTION

Figure 1:
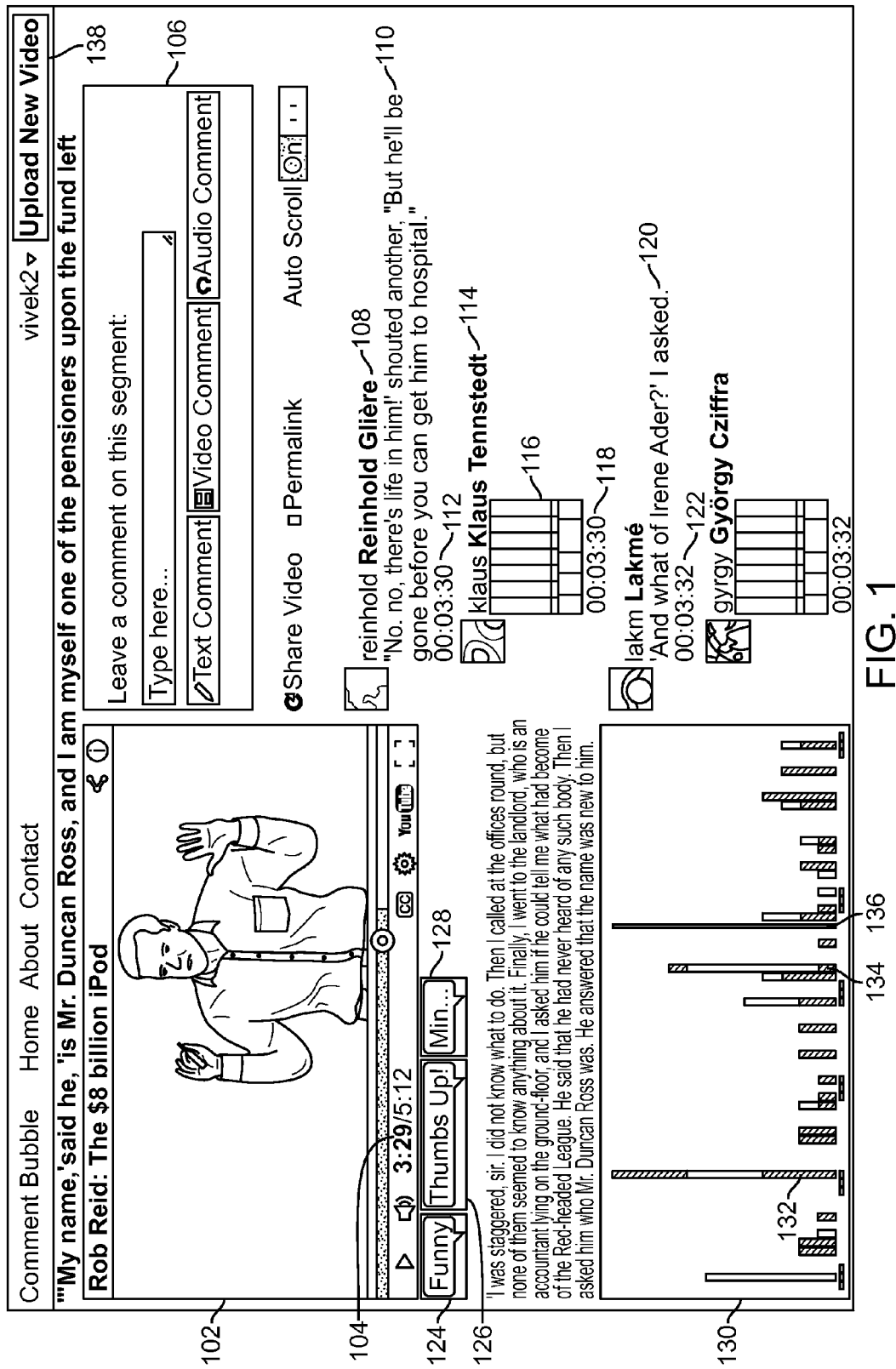
FIG. 1 is a diagram illustrating an example of a video presentation user interface that includes separate regions for timestamped comments and a feedback bar graph, according to an embodiment of the invention.

Disclosed herein are systems and techniques for enabling a community of on-line users to comment on and rate different aspects of a performance that has been captured on video. Although the term "performance" is used herein to refer generally to the content that such a video may contain, embodiments of the invention are not limited strictly to performances; various embodiments of the invention can be applied to video content of any kind, including, for example, advertisements and other kinds of presentations. However, certain embodiments of the invention may be particularly applicable to performance content. According to an embodiment, a user seeking a critique of his performance records a digital video of that performance and uploads it over the Internet to a server, where it is stored in connection with that user's account. The server associates that video recording with a unique uniform resource locator (URL). Other users who are aware of the video recording's associated URL can enter that URL into the navigation bar of their Internet browser applications in order to access, from the server, a web page that includes a control for streaming the video recording over the Internet. In this manner, other users can view the video recording of the user who uploaded that video recording to the server.

The web page on which the video presentation control is contained also can include user interface elements through which the viewing users can submit, over the Internet, to the server, comments and ratings pertaining to the performance. The server, upon receiving these comments and ratings, can tag or otherwise associate these submissions with timestamps that indicate temporal positions at which the video recording was currently playing at the times that the submissions were received. For example, if the video presentation control was currently showing a video frame corresponding to the 3:55.23 minute/second mark in the video recording at the time that the server received a particular submission, then the server can associate that particular submission with a timestamp indicating 3:55.23. Thus, each submission can be associated with the temporal portion of the video recording to which that submission pertains. The server can also tag or otherwise associate these submissions with the identities of the users who submitted them. The server can store each received submission in association with the recorded video to which that submission pertains.

As the server receives and stores the submissions, the server can present these submissions to other users viewing the web page. The web page can contain programmatic controls that allow the server to refresh each instance of the web page's content over the Internet, thereby allowing the server to "push" the submissions over the Internet to other users' computers in real-time, as the submissions are generated. Thus, as one user comments on the performance captured in the video recording that user's comments can be made visible to other users who are also currently viewing the same video recording. This real-time feature can enable users in the on-line community to conduct interactive discussions pertaining to the performance Furthermore, the server can store the various users' submissions persistently in association with the web page, so that those submissions can be recalled at even a much later time. When a user directs his Internet browser application to the video recording's URL, the server can generate the web page to include all (or at least some subset at a time) of the submissions that even have been associated with that video recording. As a result, users who view the video performance are able to see other user's submissions potentially long after those other users submitted them.

As is mentioned above, the server can store submissions in association with timestamps and user identities of the users who generated those submissions. The server can generate or refresh the video recording webpage to include, along with each submission, an indication of the timestamp that is associated with that submission, so that other users viewing the web page are able to determine the temporal portions of the video presentation to which each submission pertains. Additionally, the server can generate or refresh the video recording webpage to include, along with each submission, an indication of the identity of the user who generated that submission. The identity can include, for example, a user name and a graphical avatar icon that are specific to the user who possesses that identity. Submissions can be in the form of textual comments. In one embodiment, submissions can be made in response to other submissions. The server can store data that indicates which submissions are responsive to other submissions. The server can use this data to indent some comments beneath other comments or otherwise visually format a comment section of the web page in order to signify to viewing users which comments were responsive to other comments.

Although submissions can be textual, some submissions can take other forms. In one embodiment, the web page includes a set of graphical buttons proximate to the video presentation control through which the video is streamed. Each such graphical button can have a different label and a different color. Each button can correspond to a different rating or pre-specified comment. For example, if the video presentation pertains to a comedic performance, such as an on-stage comedy routine, then the buttons might have pre-specified labels such as "funny," "boring," "offensive," "weird," etc. Such labels can be pre-selected in order to solicit specific responses from the video recording's viewers in the on-line community. For example, in one embodiment, the quantity of buttons and the labels on the buttons can be specified by the user who originally uploads the video recording to the server. This user may have some idea of the kinds of critical submissions, ratings, or other types of feedback in which he is most interested. In this way, the video uploader can attempt to constrain at least some submissions into categories of the video uploader's interest. Like other submissions, the server can detect each user's activation of a graphical button, and can store, in association with the button's identity, a timestamp indicative of the temporal position at which the video recording was being presented at the time that the button was activated. In one embodiment of the invention, described in greater detail below, the server can use historical button label information gleaned from other users of the commentary system in order to suggest button labels to a user based on the user's stated goals.

In addition to the set of buttons described above, the web page can also include a bar graph or other visual indicator of the quantity of times that each button was selected by users from the on-line community at different time intervals in the video presentation. The bar graph can be divided into a set of sections, each section pertaining to a different button in the set of buttons. For example, a first section might pertain to the "funny" button, while a second section might pertain to the "boring" button. In each section, a vertical axis of the graph can represent a quantity of activations of the button corresponding to that section during a particular time interval, and the horizontal axis of the graph can represent the time intervals. The length of each bar can indicate a quantity of activations. Each section's bars can be the same color as the button to which that section corresponds, so that viewers can easily correlate the various buttons' labels with the corresponding sections of the bar graph.

For example, each time interval might correspond to a separate 5-second span of the video recording. A graphical bar for the first time interval in the "funny" section might indicate that viewing users activated the "funny" button 10 times during the first time interval, while a graphical bar for the second time interval in the "funny" section might indicate that viewing users activated the "funny" button only 2 times during the second time interval. Next to this section, a graphical bar for the (same) first time interval in the "boring" section might indicate that viewing users activated the "boring" button only 1 time during the first time interval, while a graphical bar for the (same) second time interval in the "boring" section might indicate that viewing users activated the "boring" button 17 times during the second time interval. Such viewer feedback can help the video uploader analyze and improve his performance. In the foregoing example, the performer might consider retaining the portion of his performance corresponding to the first time interval, but might also consider modifying or eliminating the portion of his performance corresponding to the second time interval. Additionally, the performer might consult the textual comments having timestamps occurring within each section in order to attempt to obtain more specific feedback relating to each time interval. The bar graph can serve as a sort of index to focus the video uploader's attention on specific sections of the textual comments. Although the time intervals are of uniform length in one embodiment of the invention, in an alternative embodiment of the invention, the time intervals can be of variable lengths. For example, the video uploader could divide the video presentation into specified sections, each section having a different duration.

In one embodiment of the invention, the bar graph discussed above can be refreshed in real-time in a manner similar to that in which the textual comments section of the web page can be refreshed. As buttons are activated by users in the on-line community, the server can revise the bar graph and "push" the graph out to instances of the web page currently being displayed on various users' Internet browser applications. Although a bar graph can be presented in one embodiment of the invention, in alternative embodiments of the invention, different kinds of graphs illustrating the same kind of information can be displayed in the user interface instead. Such other kinds of graphs can include, for example, line graphs, pie charts, circular clock-like charts, etc.

Video Presentation Interface

FIG. 1 is a diagram illustrating an example of a video presentation user interface that includes separate regions for timestamped comments and a feedback bar graph, according to an embodiment of the invention. In one embodiment, the user interface is specified in a markup language such as Extensible Markup Language (XML). The user interface includes a video presentation 102. As shown in this example, video presentation 102 originates from a server separate from the server that has generated and presented the user interface. In alternative embodiments of the invention, video presentations can be uploaded to and stored on either the same server or different servers from the servers that receive, store, and present user submissions relative to those video presentations. In the present example, video presentation 102 is being streamed from popular video media site YouTube.

Video presentation 102 includes a play time indicator 104 that indicates the current temporal position within the video presentation as well as the total duration of the video presentation. The current temporal position indicates the duration of the time interval that spans from the beginning of the video presentation to the video frame that is currently being viewed. In this example, the current temporal position is 3:29 and the total duration is 5:12. In an embodiment of the invention, user submissions received through the user interface are timestamped with the current temporal positions that were effective at the moments of those submissions. Thus, a submission entered by a user from the on-line community through the user interface as shown would be timestamped as approximately 3:29 (with potentially finer granularity). In the example shown, video presentation 102 is accompanied by video play controls that permit users to pause or continue playing video presentation 102 as desired. The pause feature can aid users who want to interrupt their viewing of video presentation 102 temporarily in order to enter a submission through the user interface using techniques described with further detail below. In the example, shown, video presentation 102 is also accompanied by a slider control that enables users to select specific time points at which to resume the playing of video presentation 102. Although an embodiment is described above in which a user can manually pause video presentation 102, in one embodiment of the invention, a server that is presenting the user interface additionally or alternatively can automatically pause video presentation 102 in response to detecting that a viewer of video presentation 102 has started to type or otherwise submit a comment (the process for which is discussed below) regarding a specific time point in video presentation 102. Under such circumstances, the time point to which such a comment pertains can be the time point corresponding to the frame within video presentation 102 that is being displayed when video presentation 102 is paused.

Freeform Textual, Video, Audio, and Drawing Submissions

The example user interface shown also includes a freeform submission control 106. Freeform submission control 106 enables users from the on-line community to submit information, in the form of comments, pertaining to specific time points in video presentation 102. Freeform submission control 106 enables the submission of a variety of different types of information. As shown, freeform submission control 106 includes separate buttons for text comments, video comments, and audio comments. In an embodiment, an on-line commentator can activate any of these buttons to select the type of information that he wishes to submit in relation to a specific time point in video presentation 102. If the on-line commentator has selected the text comment button, freeform submission control 106 presents a text entry field into which the commentator can type a textual comment. In one embodiment, in response to the text entry field gaining focus and/or in response to a user's selection of any of the comment buttons in control 106, the server automatically pauses video presentation 102.

After the commentator has finished typing his textual comment into the field, the commentator can press "enter" in order to cause his textual comment to be transmitted from his Internet browser application, over the Internet, to the server that receives and stores user submissions. The commentator's browser application can determine and send the timestamp along with the textual comment, or the receiving server can determine the timestamp after receiving the textual comment. In either case, the server stores the textual comment in association with the timestamp. The server also stores an identity of the commentator, if the commentator's identity is known (e.g., through a log-in mechanism), in association with the textual comment. As will be discussed further below, the server can generate new versions of the user interface, and/or refresh user interfaces currently being presented, to include recently submitted textual comments along with their associated timestamps and user identities, In an embodiment, an on-line commentator also can alternatively select the audio comment or video comment buttons in order to cause the user interface to adapt freeform submission control 106 to receive submissions of the indicated types. For example, in response to a commentator's submission of the video comment button, freeform submission control 106 can present menus (potentially invoking methods of the commentator's operating system) through which the commentator can specify a video file to be uploaded to the server from the commentator's own computer. For another example, in response to a commentator's submission of the audio comment button, freeform submission control 106 can present menus (again, potentially invoking methods of the commentator's operating system) through which the commentator can specify an audio file to be uploaded to the server from the commentator's own computer. The server can receive such files over the Internet and can store such files as user submissions in association with timestamps and commentator identities, similar to the manner in which the server does so relative to textual comments as discussed above. In alternative embodiments, freeform submission control 106 can present a field through which a commentator can type a URL that indicates a server and directory path at which the video or audio file to be submitted as a comment can be found. Under such circumstances, the submission might not be uploaded to the server at all. Instead, in such a scenario, the server can store an association between the URL, the timestamp, and the commentator's identity. The content of the linked-to file can be obtained over the Internet from the URL-indicated location at such a time that the content is going to be presented through the user interface.

Although one embodiment of the invention provides mechanisms whereby users from the on-line community can upload previously recorded video or audio files as submissions pertaining to time points within video presentation 102, in an alternative embodiment of the invention, such video or audio submissions can be generated and stored "on the fly." For example, in one embodiment, in response to a user's selection of the video comment button, code embedded within the user interface can cause the user's computing device's camera to begin recording motion video (potentially with audio). The user interface can display a pop-up window that shows the user the content that the camera is recording. When the user is finished recording, the user can select an element within the user interface (e.g., a "stop" button), and the server can responsively store the video recording as a video comment. Similarly, in one embodiment, in response to a user's selection of the audio comment button, code embedded within the user interface can cause the user's computing device's microphone to begin recording sound. The user interface can display a pop-up window that shows the user an audio equalizer graphic indicative of the sound that the microphone is recording. When the user is finished recording, the user can select an element within the user interface (e.g., a "stop" button), and the server can responsively store the sound recording as an audio comment. Although freeform submission control 106 contains buttons for textual, audio, and video comments, in one embodiment of the invention, a similar freeform submission control can contain buttons for other kinds of submissions. For example, in one embodiment of the invention, a similar freeform control can contain a button for submitting a drawing comment. In response to a user's activation of a drawing comment button, the user interface can receive touch gestures or mouse movements that represent drawing strokes made over some designated region of the user interface. Such strokes can be displayed as drawn lines within a currently presented frame of video presentation 102, for example. The user can indicate via activation of another control that the drawing comment is complete. Thereafter, the drawing comment, including all of the drawing strokes, can be stored in association with a time point and displayed in a manner similar to that in which video comments can be displayed, as is discussed in greater detail below.

Thus, comments submitted by various users in the on-line community, from separate computing devices, can be in the form of text comments, audio comments, and/or video comments (which also can contain accompanying audio). Each comment, or a reference to that comment, can be stored at the server in association with that comment's timestamp and user identity. In one embodiment, the server can store or refer to multiple different video presentations, and each such video presentation can be associated with a separate set of submissions. In such an embodiment, in addition to storing a timestamp and commentator identity in association with a submission, the server can also store an identity of the specific video presentation to which the submission pertains. In the example shown in FIG. 1, the user interface additionally presents a button 138 that a viewer of the user interface can activate in order to invoke a mechanism that enables the submission of a new video presentation to the server. In this example, button 138 is displayed next to a unique identifier for the user who is currently logged into the system that provides the user interface.

Real-Time Communal Timestamped Multimedia Comment Log

In an embodiment, the submission of a comment through freeform submission control 106 causes the server to update the user interface in real-time. The updated user interface can be transmitted over the Internet to the browser applications of computing devices that are requesting the user interface for the first time. Additionally, in one embodiment, the server can push updates to the user interface (e.g., using asynchronous JavaScript and XML (AJAX) or other technology) over the Internet to browser applications that are currently displayed the user interface. In such an embodiment, the browser applications can dynamically refresh the user interface, or updated portions thereof, based on the data that the server has pushed. Regardless of the specific technique used, the server can cause the user interface to include at least a subset of the textual, audio, and/or video comments that users from the on-line community have submitted relative to video presentation 102. An example of the manner in which these comments can be presented with the user interface is discussed below.

As shown in the example of FIG. 1, beneath freeform submission control 106, the user interface presents multiple comments pertaining to specific time points within video presentation 102. The server received these comments over the Internet from various separate computing devices operated by various different users at various different times. These comments were made using instances of freeform submission control 106 within instances of the user interface presented by the separate computing devices' Internet browser applications. Included within these comments are a textual comment 110 and a video comment 116.

Textual comment 110 was submitted by a user 108 having the unique identity "reinhold" and name "Reinhold Gliere." The identity and graphical avatar of user 108 are presented immediately above textual comment 110. Immediately below textual comment 110, the user interface displays timestamp 112. Timestamp 112 indicates that textual comment 110 pertains to the 3:30 (3 minutes and 30 seconds) time point within video presentation 102. Timestamp 112 thus indicates that user 108 was viewing the frame at the 3:30 time point within video presentation 102 at the time that user 108 submitted textual comment 110 using an instance of freeform submission control 106.

Video comment 116 was submitted by a user 114 having the unique identity "klaus" and name "Klaus Tennstedt." The identity and graphical avatar of user 114 are presented immediately above video comment 116. Immediately below video comment 116, the user interface displays timestamp 118. Timestamp 118 similarly indicates that video comment 16 pertains to the 3:30 (3 minutes and 30 seconds) time point within video presentation 102. This is to be expected in this particular case, because video comment 116 was submitted as a reply to textual comment 110. Indentation of video comment 116 below textual comment 110 signifies the responsive nature of the former comment to the latter comment in an embodiment, the user interface provides a mechanism through which an on-line commentator can specify to which of several displayed submissions his own submission is meant to be a reply. For example, the user interface can provide a mechanism through which a user can click on or touch a particular submission in order to select that particular submission. The user interface can highlight such a user-selected submission to visibly distinguish it from other nonselected submissions. In an embodiment, the server determines that a submission received through freeform submissions control 106 while another particular submission was highlighted is meant to be a response to that particular submission. In such an embodiment, the server stores the newly received submission in association with the particular submission as a reply to that particular submission. The indentation of some responsive comments below other comments therefore forms a kind of comment hierarchy, in which the responsive comments are at a lower level of the hierarchy than the comments to which they are responsive. In one embodiment of the invention, the user interface includes one or more controls that a user can activate in order to expand or collapse comments that are within various levels of the comment hierarchy, thereby causing those comments to become revealed or obscured in the real-time comment log as seen by that particular user.

In an embodiment, video comment 116 initially is presented as a thumbnail image. The thumbnail image can be a (potentially automatically) selected frame from the video content that user 114 provided as a submission. In such an embodiment, in response to the viewer of the user interface clicking on or otherwise selecting the thumbnail image, the user interface begins to present video comment 116 within the boundaries that the thumbnail occupied. Thus, the viewer can watch a motion video (potentially with accompanying audio) comment that another user from the on-line community submitted in response to video presentation 102. By consulting timestamp 118, the viewer can determine the precise temporal location within video presentation 102 to which video comment 116 pertains.

Different on-line commentator submissions can pertain to different time points within video presentation 102. Although comments 110 and 116 both pertain to the 3:30 time point, another textual comment 120 from yet another user pertains to a different time point. As shown, textual comment 120 is associated with timestamp 122, which indicates that textual comment 120 pertains to the 3:32 time point within video presentation 102. Yet another video comment has been submitted as a reply to textual comment 102.

In one embodiment of the invention, the user interface includes controls that a viewer can activate in order to filter the comments or other submissions. For example, the user interface can include a control that can he used to specify that comments from a particular submitter should be omitted from the real-time comment log.

In one embodiment of the invention, each comment in the real-time comment log includes, proximate to it, controls that other users in the on-line community can activate in order to register positive or negative votes for that comment. In one embodiment, a user who receives a sufficiently high quantity of positive votes (in the aggregate, with negative votes offsetting the positive ones) relative to his comments can be automatically designated an "expert." Such a designation is discussed in another section below pertaining to an audience marketplace.

Categorized Quick Submissions and Bar Graph

Although some submissions from users in the on-line community can be received through freeform submission control 106 in the user interface, embodiments of the invention additionally can include other mechanisms, also with the user interface, through which such users can select pre-specified (prior to the generation of the user interface) categorized submissions that pertain to video presentation 102. In the example shown in FIG. 1, the user interface includes graphical interface elements such as buttons 124, 126, and 128. In one embodiment, such as in the example illustrated in FIG. 1, buttons 124, 126, and 128 have the appearance of "comment bubbles" of the variety that one might see in a comic strip as an indication that something audible is being said. Each button has a different label, and each button has a different color. Button 124 is blue and has the label "Funny." Button 126 is orange and has the label "Thumbs Up!" Button 128 is green and has the label "Meh . . . " Thus, buttons 124, 126, and 128 correspond to different pre-specified submission categories. A viewer of the user interface can input a submission by activating any of buttons 124, 126, or 128. Although a particular set of buttons is shown, alternative embodiments of the invention can include different quantities of buttons with different colors and/or labels. In one embodiment, a user who originally uploaded or referred to video presentation 102 can specify the quantity, colors, and labels of the buttons. In this manner, such a user can solicit, from the on-line user community, specific categorized comments, critiques, or other feedback in which that user is most interested. Although in one embodiment only the uploader of video presentation 102 can specify the attributes of the buttons, in an alternative embodiment of the invention, other users from the on-line community viewing video presentation 102 can use controls in the user interface to add new buttons, having attributes of those users' designation, to the set of buttons displayed. In one embodiment, the uploader of video presentation 102 can control whether or not other users in the on-line community are granted this button-adding ability relative to video presentation 102.

As with freeform submissions entered using freeform submission control 106, categorized submissions made through the activations of buttons 124, 126, and 128 also can be associated with timestamps and user identities. For example, in response to a user selecting button 124 while video presentation 102 is temporally positioned at the 3:29 time point, the server can store a submission that maps that user's identity to a "Funny" categorized submission (corresponding to the label on button 124) and the 3:29 time point. The server can generate and/or update, in real-time, a bar graph 130 that indicates, for various time intervals, and for various submission categories, the quantities of submissions that have been received from users in the on-line community for each such category in each such time interval. Similar to the manner in which the server can push updated textual, video, and audio comments to Internet browsers that are currently displaying the user interface, the server in one embodiment also can push the real-time updated bar graph 130 to those browsers in order to refresh the user interface on various separate computing devices as the server receives categorized submissions.

Bar graph 130 is a two-dimensional bar graph in which the vertical axis represents a quantity of submissions and in which the horizontal axis represents time. Different time intervals are therefore represented along the length of bar graph 130. Numeric indicators of selected time points are indicated beneath the horizontal axis at periodic intervals. In one embodiment, each time that the server receives a categorized submission due to the activation of one of buttons 124, 126, or 128, the server increments a time-interval specific count for he particular submission category to which the activated button corresponds. From among several separate time-interval specific counts that are associated with the particular submission category, the server updates the count that corresponds to the time interval that contains the time point to which the categorized submission is mapped. In other words, based on the particular time point that corresponds to the video frame that is currently being shown in video presentation 102 at the moment that the button is activated, the server can determine into which of several time intervals that particular time point falls, and can increment the count for that time interval and category combination (e.g., a count for the 3:25-3:30 interval in the "Funny" category).

For each time interval, bar graph 130 contains one or more vertical colored bars (potentially stacked one on top of the other within a particular time interval), each having a height or size that is indicative of the quantity of submissions received in a particular category for that time interval. For each category corresponding to one of buttons 124, 126, or 128, a particular time interval in bar graph 130 can contain a vertical colored bar having the same color as the button to which it corresponds. For example, at time interval 132, three differently colored (blue, orange, and green) vertical bars are stacked on top of each other, each corresponding to a different submission category, and each having a height that is proportionate to the quantity of submissions that were received for that submission category and that pertain to time points within time interval 132. For another example, at time interval 134, three differently colored (blue, orange, and green) vertical bars are also stacked on top of each other, each corresponding to a different submission category, and each again having a height that is proportionate to the quantity of submissions that were received for that submission category and that pertain to time points within time interval 134. The heights of the bars in time interval 132 are different from the heights of the bars in time interval 134 because the quantities of submissions for each submission category differ between those time intervals. In some time intervals represented along bar graph 130, some submission categories might not be represented by correspondingly colored bars in those intervals, because no submissions for those categories were received in relation to any time points occurring within those time intervals.

Thus, by consulting bar graph 130, a viewer (including the original uploader of video presentation 102) can determine, for each time interval in a set of time intervals spanning the duration of video presentation 102, how many submissions for each specified category were received from users in the on-line community relating to time points in that time interval. The viewer can therefore ascertain which parts of a performance captured within video presentation 102 are the most funny, the most appreciated, the most uninspiring, or the most superlative in other pre-specified categories.

In one embodiment, bar graph 130 also contains a moving temporal position indicator 136. Temporal position indicator 136 can be represented as a thin vertical red line that moves from left to right along the length of bar graph 130 as video presentation 102 plays. At every moment in time, the location of temporal position indicator 136 corresponds to the current temporal position shown in play time indicator 104. Thus, at any particular time point at which video presentation 102 is currently being presented (potentially paused), temporal position indicator 136 will be located within a time interval in bar graph 130 that contains that time point. This enables a viewer to determine more easily the part of bar graph 130 that corresponds to the part of video presentation 102 that is currently being displayed. In one embodiment, a user's movement of the slider control to select a new time point in video presentation 102 also causes the temporal position indicator 136 to be repositioned along bar graph 130 at a location corresponding to the newly selected time point. Conversely, in one embodiment, in response to a user selecting a particular time point within bar graph 130, code within the user interface moves the temporal position indicator 136 to that selected time point and also skips the current temporal position within video presentation 102 to the equivalent time point, so that video presentation 102 resumes play from that time point.

As is discussed above, in one embodiment of the invention, a user can use Internet browser application to upload a video file to a server that stores such video files and generates the user interface shown in FIG. 1. Such video files can contain the content that such a user interface can present as video presentation 102 and other video presentations. In alternative embodiments, a user can use his Internet browser application to specify the URL or other identifier for video content that is already stored at some Internet-accessible location. Under such circumstances, the server that generates the user interface shown in FIG. 1 might not actually store a copy of the file representing the video content, but instead may store a link or reference to the location at which that file can be found. The server may cause the content of such an externally located video file to be streamed over the Internet to various users' computing devices from the location at which that video file is located rather than from the server's own storage devices.

In one embodiment of the invention, the user interface provides a control that a user can activate in order to cause any portion of any bar graph to appear more prominently, thereby "zooming in" on that portion. For example, using such a control, a user may specify that a particular selected time interval in the bar graph should be zoomed in on. When zooming in on the selected portion, the server can re-render the bar graph region to include only the user-selected portion of the graph, excluding portions of the graph that the user did not select. The user interface control also may provide a control that the user can activate to zoom back out to the full view of the complete bar graph.

In one embodiment of the invention, the web page encoding the user interface further includes code that a browser interprets to cause certain operations to occur in response to the user moving a mouse pointer over certain elements of the bar graph (or other portions of the user interface). For example, in one embodiment of the invention, in response to detecting that the user has moved the mouse pointer over a specific bar in the bar graph, thereby "hovering" over that bar, one or more avatar images of the users who posted the categorized submissions involved in the composition of that bar can be displayed overlaid on the bar graph for as long as the mouse pointer remains stationary.

In one embodiment of the invention, the user interface includes a control that a user can select in order to cause his categorized submission, made through the activations of the buttons, private. In such an embodiment, if the user's submissions have been made private, then users other than the submitter and the video presentation provider cannot see those submissions, and those submissions do not influence the information represented in the bar graph as seen by such other users.

Multi-Source Video Registration Interface

Figure 2:
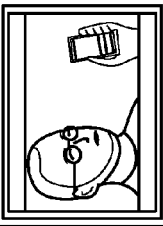
FIG. 2 is a diagram illustrating an example of a video content selection user interface that includes options for indicating a source from which a video presentation is to be obtained, according to an embodiment of the invention.

FIG. 2 is a diagram illustrating an example of a video content selection user interface that includes options for indicating a source from which a video presentation is to be obtained, according to an embodiment of the invention. In one embodiment, in response to a user's activation of button 138 shown in FIG. 1, the server sends, to the user's Internet browser, another user interface similar to the one shown in FIG. 2. This subsequent user interface assists the user in informing the server where to find video content that is to serve as the basis for a new video presentation that the user would like to share with the on-fine community of users— potentially so that those users in the on-line community can submit comments pertaining to specific time points within that video presentation. The user interface shown in FIG. 2 includes an overlaid window that instructs the user to choose a video format that is the most convenient for the user. The window includes at least two options, each with an associated radio button that the user can select in favor of the other. In the example shown, the first option indicates that the video content will be designated through a user-specified URL or YouTube (or other on-line video presentation site) identifier. The second option indicates that the video content will be designated by a directory path and filename of a file that is stored locally on the user's own computing device.

After selecting one of the two options by clicking on its associated radio button, the user can type, into a field that is displayed in the window beneath the options, information that identifies the location from which the video content is to be obtained. If the first option was selected, then the field can receive a user-specified URL or YouTube (or other on-line video presentation site) identifier that indicates an Internet-accessible location at which a desired video file is stored. If the second option was selected, then the field can receive a user-specified directory path and filename for a video file that is locally stored on the user's own computing device. In the latter case, the user interface may invoke methods of the computing device's operating system in order to cause the display of menus that can assist the user in specifying the directory path and filename. In either case, after the location of the video content has been specified, the server can either store a reference to the video content's location (in the case of the first option) or receive the video content itself over the Internet (e.g., using the File Transfer Protocol (FTP)) from the user's own computing device. If the server receives the video content from the user's own computing device, then the server can store that video content on the server's computing device for later presentation through a user interface of the kind shown by way of example in FIG. 1. Each submitted video content item can be associated on the server with a unique video content identifier that distinguishes that video content item from all others As is discussed above, in one embodiment, user submissions made in reference to a video presentation are stored on the server in association with that video presentation's unique identifier. Additionally, each submitted video content item can be associated on the server with a unique video content URL. In one embodiment, this video content URL is the URL of the web page that specifies the markup language code for the user interface in which the video content item is to be presented—which may differ from a URL at which the video content item itself is located (potentially externally to the server).

In one embodiment of the invention, the user interface includes a control through which the user can indicate that the video content is to be part of a private collection not co-mingled with the general video content population. In one embodiment of the invention, such a private collection is generated in the system in exchange for pecuniary compensation paid to the operator of the commentary system. The private collection can be restricted to users who are members of a specified group, such as a school or other "walled" community. In one embodiment, only members of such a group can view video presentations that are in the group's private collection, and only members of such a group can upload new video content to that private collection. In one embodiment of the invention, users are admitted to such private groups by authenticating with the commentary system using e-mail addresses that have domains that are associated with those private groups.

Hypothetically, video content that is present on an on-line video sharing web site, such as YouTube, might already have a corresponding web page within the commentary system. For example, a user might have uploaded that video content to the commentary system without being aware of the same video content being present on the other video sharing web site. Alternatively, the user introducing the video content to the commentary system might be aware of that content's presence on YouTube because that user might be introducing that content directly from YouTube using the interface described above in connection with FIG. 2. In either case, in one embodiment of the invention, the user interface includes a control through which the user introducing the video content can specify that user comments posted to the corresponding video content web page on the other video sharing web site are to be imported automatically into the submissions pertaining to the video presentation on the commentary system. In such an embodiment, the server of the commentary system can periodically check the corresponding video web page on the other video sharing web site and can automatically import, into the commentary system, any user comments that have been made on that other web site since the last time that such comments were imported. Such comments can be displayed in the real-time comment log section of the user interface discussed above in connection with FIG. 1.

Video Attribute Specification Interface

FIG. 3 is a diagram illustrating an example of a video attribute specification user interface that includes controls for specifying various attributes of video content that has been introduced into the timestamped commentary system, according to an embodiment of the invention. In one embodiment, the server sends the user interface shown in FIG. 3 over the Internet to a user's browser application after the server receives video content or a reference to that video content via the user interface described above in connection with FIG. 2. The user interface shown in FIG. 3 enables the user to specify various attributes to describe and control the presentation of the video content to other users in the on-line community.

A video title control 302 enables a user to enter a relatively brief textual label that is to be presented immediately above the video presentation in a user interface similar to that shown in FIG. 1. In the present example, the user has entered the title "Clap It Up (Step Up Parody)" using control 302.

A video description title control 304 enables a user to enter a lengthier textual description that is to be presented immediately below the video presentation in a user interface similar to that shown in FIG. 1. In the present example, the user has entered, using control 304, a description that reads, in part: "SUBSCRIBE to Above Average Network: //bit.ly/LIHUTM . . . "

A visibility control 306 enables a user to indicate whether the video presentation can be accessed only by those who know the video presentation web page's URL or whether the video presentation can be accessed by other means (e.g., through results found by a web-crawling search engine). User-selectable radio buttons are presented in visibility control 306 in association with a first option that indicates "private (anyone with link)" and a second option that indicates "public (searchable by anyone)." In one embodiment, selection of the first (private) option causes the server to prevent automated web-crawling mechanisms of Internet search engines from discovering and indexing the web page that will contain the on-line submission interface for the video presentation. For example, this prevention can be achieved through the specification of a password that will be required of those seeking to view that web page. In one embodiment, the selection of the second (public) option causes the server, alternatively, to allow such automated web-crawling mechanisms of Internet search engines to discover and index the web page that will contain the on-line submission interface for the video presentation. Consequently, references to that web page may be included in the search results that such Internet search engines return to users who submit searches for keywords that are contained in that web page.

Furthermore, in one embodiment, the server on which the web page is stored may provide its own facility for searching video content items stored on that server. For example, such a server-provided search facility may enable a user to search for video content items that are associated with specified keywords. In one embodiment, the selection of the first (private) option causes the related video presentation to be excluded from the results returned by such a server-provided search facility, while the selection of the second (public) option causes the related video presentation to be included within the results returned by such a server-provided search facility. In either case, regardless of the selection, in one embodiment, the web page that will be constructed to contain the video presentation is always accessible through the entry of that web page's URL in the navigation field of a user's Internet browser application.

An allowed comment types control 308 enables a user to indicate which types of submissions from other users in the on-line community are permitted through the user interface through which the video presentation will be presented. In one embodiment, the possible submission types include "textual," "quick," and "A/V" (or audio/video). In the example shown in FIG. 3, each submission type in control 308 is associated with a corresponding checkbox control that the user can select or unselect in order to designate whether submissions of that type arc permitted. Selection of the "textual" submission type causes the server to present subsequently, in the web page for the video presentation, within a control similar to freeform submission control 106, a "textual comment" button that users in the on-line community can activate in order to submit textual comments similar to those described above in connection with FIG. 1 (e.g., textual comments 110 and 120). Selection of the "A/V" submission type causes the server to present subsequently, in the web page for the video presentation, within a control similar to freeform submission control 106, both "audio comment" and "video comment" buttons that users in the on-line community can activate in order to submit audio and/or video comments similar to those described above in connection with FIG. 1 (e.g., video comment 116). Selection of the "quick" submission type causes the server to present subsequently, in the web page for the video presentation, categorized submission buttons similar to buttons 124, 126, and 128, which users in the on-line community can activate in order to submit, quickly, categorized pre-specified comments corresponding to the presented buttons. In one embodiment of the invention, the lack of selection of any of these submission types through control 308 subsequently causes the server to omit or to "gray out," in the user interface shown in FIG. 1, the corresponding controls through which submissions of those types would be submitted, thereby preventing the server's receipt of submissions of those types in association with that particular video presentation. Although not shown in FIG. 3, in one embodiment of the invention, a similar allowed comments type control can include additional or different submission types. For example, in one embodiment of the invention, a similar allowed comments type control can include a "drawing" submission type whose selection causes the presentation of a. "drawing comment" button within a user interface similar to that described with reference to FIG. 1.

As is discussed above i connection with visibility control 306, in one embodiment, the server provides a search facility through which users in the on-line community can search for video presentations that are associated with specified keywords. In order to facilitate such site searching, the user interface shown in FIG. 3 can include a video tag control 310 through which a user can specify tags or other keywords that the server is to store in association with that user's video presentation. The tags can be typed into a field of video tag control 310 and delimited by commas In one embodiment, after the server has stored the typed tags in association with the user's video presentation, the server can include a reference to that video presentation within results of a search that other users from the on-line community requested for video presentations matching any of those tags. For example, if the video-providing user indicates that his video presentation is to be associated with the tags "dog," "jump," and "circus," then another user's subsequent search for video presentations associated with any of those tags can, in one embodiment, cause a reference to the video-providing user's video presentation to appear within the results of that search.

A quick comments control 312 enables a user to define the categories—or labels—for the categorized submission buttons that are to be displayed below his video presentation on a user interface of the kind shown by way of example in FIG. 1. The quick comments control 312 includes a text field into which the user can enter textual labels for the categories, delimited by semicolons. After the server has stored the definitions for the categorized submission buttons in associated with the video presentation, the server can cause a separate button to be placed on the user interface for that video presentation. Each categorized submission button contains a separate one of the labels from the delimited label list entered through control 312. Examples of such buttons include buttons 124, 126, and 128 of FIG. 1. Thus, through quick comments control 312, the uploader of the video presentation can specify the quantity of and labels for each of the categorized submission buttons that will be displayed in connection with his video presentation. In this manner, the uploader of the video presentation is better enabled to solicit, from other users in the on-line community, the specific kinds of critique or feedback in which the uploader is most interested. Additionally, in one embodiment of the invention, control 312 or some other control can include a mechanism through which the uploader can designate, for each categorized submission button that will be presented along with his video presentation in the user interface, a positive-to-negative weight that is associated with that button. For example, the weight can be a positive or negative number. In one embodiment of the invention, each submission corresponding to a categorized submission button influences a total score that is associated with the video presentation. This score may be displayed in connection with the video presentation, for example, or presented on reports that include information about the video presentation.

In one embodiment of the invention, the video attribute specification user interface of FIG. 3 additionally includes a save button control 314 that a user can activate in order to cause the server to store, in association with the newly submitted video content item, all of the video attributes that the user has specified via controls 302-312. Save button control 314 can be accompanied by a cancel button control whose activation will cause the video attribute specification user interface of FIG. 3 to be exited without associating any of the specified video attributes with the video content item.

Video Collection Interface

FIG. 4 is a diagram illustrating an example of a video collection user interface that lists video presentations that a particular user has introduced into the timestamped commentary system, according to an embodiment of the invention.

The user interface shown in FIG. 4 includes a description of a video presentation that the user had already introduced into the system: video presentation description 402. The user interface additionally includes a description of a new video presentation that the user has just recently introduced into the system using the user interfaces of FIGS. 2 and 3: video presentation description 404. Each of video presentation descriptions 402 and 404 indicates certain of that video presentation description's attributes, including a video title, video description, and a thumbnail image from the video content item itself. In one embodiment, the user interface shown in FIG. 4 includes controls for permitting the owning user (i.e., the user that introduced the video presentations into the commentary system) to edit the attributes that are associated with a selected video presentation description. In one embodiment, the user's selection of a thumbnail image associated with a particular video presentation description in this user interface causes the server to present, to the user, a video presentation commentary user interface of the kind shown in FIG. 1, pertaining to the video presentation referenced by the particular video presentation description. In one embodiment, the user interface shown in FIG. 4 includes controls for permitting the owning user (i.e., the user that introduced the video presentations into the commentary system) to remove selected video presentations from the on-line commentary system.

Collaborative Timestamped Video Commentary

Significantly, embodiments of the invention enable users other than the provider of the video presentation himself to associate submissions, such as textual and other types of comments, with specified time points within that video presentation. This beneficially assists the video presentation provider to discover what other users think about the presentation's content more finely, at specific time points, rather than more coarsely to the presentation as a whole. Potential approaches that would allow other users to submit comments pertaining to a video presentation as a whole, but not pertaining to specific time points within that presentation, therefore may fail to provide the benefits that can be achieved through the systems and techniques described herein. Additionally, potential approaches that would allow the video presentation provider himself to associate specified comments with specific time points within the video presentation would not necessarily allow users other than the provider himself to make such time point-specific comments relative to the presentation. Thus, even though such potential approaches might allow the video presentation provider to show textual commentary to other users at time points of the provider's own selection, such potential approaches would fail to provide the benefit of allowing time-specific commentary in the other direction: from the on-line community of users to the video presentation provider. Potential approaches such as those contemplated above would not achieve the goal of allowing the video presentation provider to obtain critiques of the content of his video presentation from other users in the on-line community in a time point-specific manner. In contrast, the systems and techniques disclosed herein can help a person, such as a comedian, for example, to ascertain from others which parts of his video-recorded performance are most humorous and which parts of that performance might need more work. Other performers who might find the systems and techniques disclosed herein to be useful may include, for example, teachers, actors, marketers, etc.

Demographical Segmentation

In one embodiment of the invention, the users in the on-line community can register accounts with the server that provides the video presentation commentary system discussed above. The users can access the system by logging into these registered accounts. In one embodiment, as a part of the account registration process, each user in the on-line community can be asked to provide demographic information about himself, such as, for example, his age, his gender, his race and/or ethnicity, his income level, his education level, his geographical location, etc. The server can store these demographic traits in association with the user's account at registration time, In an embodiment, the server can use the stored user identity-to-submission associations in order to segment a particular video presentation's submissions into various demographic categories. For example, the server can provide a user interface through which the video presentation provider can indicate the demographic categories in which he is interested (e,g., Caucasian females aged 18-25). The server can receive the provider's desired demographic categories and can generate a submission report that indicates, for each of the textual, audio, and video submissions received in relation to the video presentation, which of the demographic categories the submitter of that submission falls into. The report can indicate a total quantity of submissions made by users in each demographic category. Within each category, the submissions can be further segmented into time intervals, as discussed above.

Additionally, in one embodiment, the server can generate a report having an appearance similar to bar graph 130 of FIG. 1, except that the information within that bar graph can be further segmented into the specified demographic categories. Thus, for example, each time interval can indicate, for each specified demographic category, the number of times that users within that demographic category selected each categorized submission button in connection with a time point falling into that time interval. Additionally or alternatively, the server can generate a report containing multiple separate instances of bar graph 130, with each instance containing data only for a different specified demographic category. Thus, a first bar graph can indicate time-specific button selections received from users in a first demographic category, while a second bar graph can indicate time-specific button selections received form users in a second demographic category, etc.

Beneficially, demographic-specific feedback of the kind discussed above can help the video presentation provider to determine, for different audiences, how those audiences tend to react to different parts of his presentation. Demographic-specific feedback of the kind discussed above can help the video presentation provider to determine, for different audiences, which parts ought to be specifically tailored for those audiences. Those parts might very well differ for different demographic segments.

In one embodiment of the invention, the server provides a mechanism whereby a user can instruct the server to generate custom reports pertaining to the submissions. The server can receive user-specified criteria and generate reports based on those criteria. For example, the criteria can indicate that the report should include only information based on submissions that satisfy the criteria (e.g., time-based, demographic-based, submission category-based, etc.). The reports can be generated as web pages, and can be printed to paper. The reports can include screen shots from any of the user interfaces. The reports can include tables that indicate instances of various comments.

According to one embodiment, the server provides a mechanism whereby analytical reports pertaining to the total collection of video presentations and/or analytical reports pertaining to the complete on-line community of users can be generated. For example, in one embodiment, such analytical information include in such reports can include identifications of a most popular video presentation (e.g., based on quantity of views), a worst video presentation (e.g., based on a quantity of negative categorized submissions associated therewith), a user involved in the most conversations, a user having the most comments, a user having the most video presentations in his collection, etc.

In one embodiment, results of various views of the same video presentation can be combined.

Targeted Video Distribution

As is discussed above, in one embodiment of the invention, the video presentation provider can specify whether his presentation is to be public—accessible to any user of the commentary system—or private—accessible only to those who possess the video presentation's unique URL. In one embodiment, the system provides a mechanism by which the video presentation provider can target the distribution of his video presentation to specific users, and/or to non-specific users having specific attributes.

In one embodiment of the invention, the system provides a user interface through which the video provider can specify, to the server, a list of other users of the commentary system that the video provider wants to access and comment on the presentation. In one embodiment, the system presents a potentially searchable list of the system's users from which the video presentation provider can select specific users from whom comments on the presentation are to be solicited. In response to receiving such a list of the system's users, the server can send notifications to each of the users. The notifications can be in the form of e-mail messages addressed to the e-mail addressed indicated in the designated users' account information, for example. Each such e-mail message can specify the URL of the video presentation or can contain a selectable hyperlink that will cause the activator's Internet browser application to load the web page containing the comment submission user interface for the video presentation. Additionally or alternatively, the notifications can be in other forms, such as Short Message Service (SMS) text messages sent to the designated users' mobile devices such as smart phones, messages or comments posted to the designated users' Facebook accounts, "tweets" sent to the designated users' Twitter accounts, etc. Furthermore, a viewer who is interested in a particular video presentation provider's video presentation can optionally invoke a mechanism of the system that causes the viewer's account to become subscribed to that particular video presentation provider's video collection. Thereafter, the server can automatically send, to the subscribing viewer, a notification (in any of the forms discussed above) informing the subscribed viewer that the particular video presentation provider has added a new video to that video collection whenever the particular video presentation provider does so.

In an alternative embodiment of the invention, instead of or in addition to providing the user-specific specification distribution mechanism described above, the system provides a mechanism through which the video presentation provider can specify various attributes that the provider desires potential commenters on his presentation to have. For example, the provider might indicate, through a user interface displayed by the server, that the provider is interested in receiving submissions on his presentation from divorced female users who are aged 35-45 and earn over $250,000 per year. In response to receiving such criteria from the provider, in one embodiment, the system determines a set of the system's registered users who possess the desired attributes. The system can determine this set using the attribute information that the users themselves provided at the time of account registration with the commentary system. After determining the set of eligible users, the system can send notifications to those non-specific criteria-satisfying users in a manner similar to which the system sends notifications to specific users selected by the provider, as described above.

As a result of the foregoing targeted distribution techniques, the video presentation provider can obtain feedback, critiques, or other commentary from the kind of people in whose opinions he is most interested. This makes the information obtained through the submissions even more valuable to the video presentation provider, Controllable Feedback Visibility As is discussed above, in one embodiment of the invention, every user in the on-line community who is able to access a particular video presentation can also view the submissions that other users from the community provide relative to that presentation in real-time. In such an embodiment, the submissions from any user relative to the particular presentation are presented to all other users currently or thereafter viewing the particular presentation, concurrently or nearly concurrently with the times at which the server receives the submissions. However, under some circumstances, the video presentation provider might not want the submissions of one user to be visible to another user. For example, the video presentation provider might not want the opinions of each user to be tainted or unduly influenced by the opinions of other users viewing and commenting on the same video presentation.

Therefore, in an alternative embodiment of the invention, the server provides an option in a user interface that the video presentation provider can select in order to specify that comments received from one user are not to be made visible to other users. In response to the provider's election of this option, the server still presents controls through which users can submit time point-specific comments (including via categorized submission buttons), but the server does not display a list of other users' comments or the information contained in bar graph 130. In such an alternative embodiment, all of the users' textual, audio, and video submissions, as well as all of the categorized submission information contained in bar graph 130, remain visible to the video presentation provider, but only to him. In one embodiment, the server provides a mechanism through which the video presentation provider can subsequently toggle this visibility setting, thereby either revealing or hiding users' submissions relative to his presentation from other users in the on-line community as the provider thinks best at the time.

Categorized Viewing and Personalized Editions

As is discussed above, in one embodiment of the invention, users from the on-line community can select categorized submission buttons, such as buttons 124, 126, and 128, in order to submit an opinion quickly relative to a specific time point in video presentation 102. Such a submission can potentially be performed faster than by typing a textual comment within freeform submission control 106, for example. Such categorized submissions are stored in association with the time points to which they pertain. In one embodiment, the server provides a mechanism whereby a viewer can elect to watch only selected portions of video presentation 102 that satisfy specified criteria. These criteria can include a criterion that the portions to be viewed must be associated with a specified threshold level of some category from the categorized submissions.

The specified threshold can be in the form of an absolute quantity. For example, in one embodiment, a viewer can specify, through a user interface, that he only wants to view portions of video presentation 102 that span time intervals that contain at least 10 "funny" categorized submissions—the portions relative to which at least 10 different users in the on-line community previously selected button 124. The specified threshold can be in the form of a proportion or percentage of total viewers. For example, in one embodiment, a viewer can specify, through a user interface, that he only wants to view portions of video presentation 102 that fall within time intervals for which at least 25% of all of the viewers of those time intervals submitted "funny" categorized submissions. The specified threshold can be in the form of a proportion of percentage of categorized submissions. For example, in one embodiment, a viewer can specify, through a user interface, that he only wants to view portions of video presentation 102 that fall within time intervals for which at least 50% of the total categorized submissions registered within those time intervals were "funny" categorized submissions (rather than categorized submissions from another category like "meh"). Additionally or alternatively, in one embodiment of the invention, the video presentation provider can specify, through a user interface, amounts of time before and/or after each threshold-satisfying video portion to which the boundaries of presented content should be expanded. For example, a video presentation provider might specify, through a user interface, that 20 seconds before and 5 seconds after each threshold-satisfying video portion should be shown in addition to the content within the video portion itself.

In an embodiment, in response to receiving user-specified criteria such as those described above, the server can cause only selected portions of video presentation 102 that satisfy the criteria to be presented; portions that do not satisfy the specified criteria can be skipped over. In one embodiment, however, certain segments immediately preceding and/or following the portions that satisfy the criteria are also presented if those segments fall within the expanded temporal boundaries specified by the video presentation provider, as is discussed above. In this manner, the video presentation provider can try to ensure that interesting portions of video presentation 102 will be supplemented with adjacent portions that are likely helpful to give the interesting portions context, even if those adjacent portions do not themselves satisfy the specified criteria. In one embodiment, the server provides a mechanism whereby a viewer who has specified such criteria, and who has thereby essentially produced a customized and personalized edition of video presentation 102, can persistently store that edition in connection with that viewer's account. The viewer can later recall the stored edition (e.g., from a user interface such as the one described above in connection with FIG. 4) for future viewing. In one embodiment, rather than store separate copies of the actual video portions that satisfy the specified criteria in order to produce such a personalized edition, the server can instead simply store the specified criteria, which can be used at any time to re-create the personalized edition relatively quickly.

Automatically Generated Categorized Editions

In one embodiment of the invention, various alternative editions of video presentation 102 can be created automatically. For each particular category of the categorized submissions (i.e., for each category corresponding to one of buttons 124, 126, and 128), the server can determine automatically which portions of video presentation 102 received a least a specified quantity or a specified proportion of categorized submissions in that particular category. The server can create an edition specific to each particular category that contains only the portions that satisfied the threshold relative to that category. Such alternative editions can be selected and viewed by those in the on-line community from a user interface similar to the one illustrated in FIG. 1. In the user interface, each alternative edition can be labeled with the category that the alternative edition features (e.g., the "funny" edition, the "meh" edition, etc.).

Audience Marketplace

As is discussed above, in one embodiment, video presentation 102 can be targeted to specific users or non-specific users who have specified attributes. In alternative embodiments, the server provides a mechanism through which a provider of video presentation 102 (the user who introduces the corresponding video content item into the commentary system) can offer monetary compensation in exchange for the viewing of his video presentation by other users in the on-line community. In one embodiment, this mechanism further enables the provider to specify the attributes of the users to whom the offer is to be made.

In one embodiment, in response to the video presentation provider instructing the server to open an offer, the video server provides a user interface through which the video presentation provider can specify the demographic attributes of the users to whom the offer is to be made. The user interface can contain a field into which the video presentation provider can indicate a maximum quantity of viewers for which the offer is valid, and a maximum price that the video presentation provider is willing to pay each such viewer. After the parameters of the offer have been specified, the server can send invitations (e.g., by e-mail) to various users who possess the specified attributes. The invitation can include a link to a web page through which each user can accept or decline the invitation. In one embodiment, the server initially sends out no more than the maximum specified quantity of invitations, and only sends out additional invitations to additional users if one or more users to whom invitations were already sent decline those invitations. In one embodiment, if the server determines that there is an insufficient quantity of registered users that possess the specified attributes, taking into account those who have declined, then the server can notify the video presentation provider of this fact. The server can then permit the video presentation provider to modify the attributes that future invitees must possess and/or to modify the total quantity of viewers sought in the offer.

In one embodiment, each invitation can disclose, up front, to each invitee, the maximum amount that the invitee will be paid in exchange for viewing the video presentation. In an alternative embodiment, the invitations do not disclose any amount, but instead, the accept/decline web page that each invitee can access from his invitation's link includes a field through which that invitee can specify the minimum amount that he is willing to accept in exchange for his viewing of the video presentation. In such an alternative embodiment, if the invitee specifies an amount that is greater than the maximum per-invitee amount that the video presentation provider is willing to pay, then the invitee can be asked to try to submit a lower amount if he wants to participate in the offer. In one embodiment, if the invitee specifies an amount that is no greater than the maximum per-invitee amount, then the server stores a record indicating that the invitee accepted the offer. The record indicates the agreed-upon amount that the invitee is to be paid for his viewing of the video presentation. In one embodiment, each invitation can specify additional terms, such as that at least a specified quantity of the video presentation must be viewed by the invitee in order for the invitee to qualify for payment, and/or that the invitee is required to register at least a specified quantity of submissions in order for the invitee to qualify for payment.

Although an embodiment above involves the server inviting prospective viewers who afterward may indicate the minimum amount that they are willing to accept to participate in the offer, in an alternative embodiment, each registered user may specify, as a user profile attribute stored in connection with his account, a minimum quantity that he is willing to accept to participate in any offer. In this manner, prospective viewers can essentially "bid" for invitations. In such an embodiment, rather than specifying an amount that he is willing to pay per invitee when specifying the parameters of the offer, the video presentation provider can instead specify a total pooled amount that he is willing to pay an audience in aggregate, without concern for the exact amount that each acceptant ends up being paid. The server can then begin submitting invitations to qualifying users beginning with those who have specified the lowest acceptable amounts in their profiles, thereby prospectively obtaining more bang for the video provider's buck. The server can cease sending invitations either when a specified quantity of invitees have accepted the offer, or when the server determines that the offer's specified minimum quantity of participants cannot be achieved given the minimum amounts specified by those qualified users who have not yet been invited. In the latter case, the server can permit the video presentation provider to modify the attributes that future invitees must possess, to modify the total quantity of viewers sought in the offer, and/or to modify the total pooled amount that he is willing to pay the audience in aggregate.

In one embodiment of the invention, each invitation specifics that the offer is contingent upon a specified minimum quantity of users accepting the offer, and that the offer can be canceled at the video presentation provider's discretion if this contingency is not satisfied. In one embodiment of the invention, instead of specifying a minimum quantity of viewers who must accept the offer, the video presentation provider can request that the server obtain as many qualified viewers as possible—optionally to a specified maximum—using the total pooled amount that he is willing to pay the audience in aggregate. In such an embodiment, the server continues to invite qualified users, starting with those specifying the lowest "bid" amounts, until the total pooled amount is exhausted, or until there are no further qualified users to invite, or until the specified maximum quantity of invitees has accepted the offer, if such a maximum has been specified.

In one embodiment, the server keeps track of each offer acceptant who views the video presentation to which the offer pertains. In one embodiment, acceptants are permitted to view the video presentation and satisfy the offer's requirements even if not all of the offer's acceptants have been certainly ascertained yet. In one embodiment, the server tracks whether each offer acceptant has fulfilled the offer's stated obligations (e.g., watch at least a specified amount of the presentation, submit at least a specified quantity of comments, etc.). The server can express, to each acceptant, the obligations that the acceptant has yet to fulfill in order to receive the promised payment. In one embodiment, upon determining that a particular acceptant has fulfilled all of the offer's stated obligations, the server can automatically transfer the agreed-upon payment for that acceptant from the video presentation provider's monetary account (e.g., bank, credit, etc.) to the acceptant's monetary account. The server can automatically notify the video presentation provider regarding the details of such a transaction whenever such a transaction occurs.

In one embodiment of the invention, the server also can charge the video presentation provider in connection with various events that can take place during the conduct of an audience-based offer of the kind described above. For example, for each invitation that the server sends, the server can charge the video presentation provider's account some agreed-upon amount. For another example, for each acceptant that fulfills all of the offer's obligations, the server can charge the video presentation provider's account some agreed-upon amount. The server can transfer such amounts to an account owned by the operator of the commentary system.

In one embodiment, potentially by satisfying some test to verify legitimate credentials, certain registered users of the video commentary system can obtain an "expert" designation in a specified field. Such a designation can be associated with and publicly indicated within that user's account. A distinctive icon may be placed next to that user's avatar and/or identifier wherever it appears to signify to other that the user is an expert. In such an embodiment, a video presentation provider's offer can request a specified quantity of experts as a parameter. In response to such a request, the server can attempt to invite qualified users having the expert designation. It may be understood that the cost of recruiting an expert to view a video presentation may be significantly higher than that for recruiting a standard user. In one embodiment, the server provides a mechanism through which a video presentation provider can attempt to recruit such an expert, or any individual, to create an account with the commentary system. In such an embodiment, a user interface includes fields into which the video presentation provider can input contact information (e.g., e-mail address, phone number, Facebook or Twitter identity, etc.) for a potential recruit who does not yet have an account with the commentary system. The user interface can also include a field into which the video presentation provider can specify some monetary amount that is to be offered to the potential recruit as motivation or inducement to create the account. The user interface can also include fields into which the video presentation provider can specify one or more tasks that the provider requires the potential recruit to perform (e.g., watch at least a specified amount of a specified video presentation, submit at least a specified quantity of submissions relative to the specified video presentation, etc.) in order to qualify to receive the specified money reward. The server can then send a notification to the potential recruit through a channel appropriate to the type of contact information provided. The notification can inform the potential recruit about the offered monetary reward and the tasks that need to be performed to obtain that reward. The notification can contain a link which, when activated, causes the potential recruit's Internet browser application to load a web page through which the potential recruit can create a new account with the commentary system. The server can transfer the monetary award to the recruit's monetary account automatically upon detecting that the recruit has performed all of the tasks specified in the notification. As is discussed above, in one embodiment of the invention, a user can automatically receive the expert designation due to that user's comments receiving at least a specified threshold quantity of positive votes (in the aggregate, with negative votes offsetting the positive ones).

In one embodiment of the invention, a user who has received the "expert" designation can use a control of the commentary system to create a special consultant web page that other users in the on-line community can view. Such a consultant page can include information pertaining to the expert user's particular field of expertise, and also can include information regarding the expert user's customary fees or rates that he expects to be paid in exchange for viewing and/or critiquing the video presentations of other users. Other users in the on-line community therefore can be made aware of the expert's availability and of how much those users ought to offer in compensation for the expert's services.

Social Media Integration

In one embodiment of the invention, the server provides a mechanism whereby users from the on-line community who register accounts with the video commentary system described above can optionally link those accounts with others of their accounts on other sites, such as social media sites. Such social media sites can include those provided by Facebook and Google, for example. In one embodiment, the user can allow the video commentary system and its server to access specified personal information from that user's account on the social media site. In this manner, the video commentary system can acquire information about the user that the system might not otherwise possess. In one embodiment, the video commentary system can use such information acquired from social media sites, such as a user's likes, the places a user has been, and/or a user's social contacts, as attributes that can be used for demographical segmentation, targeted video distribution, invitation qualification, etc.

In one embodiment of the invention, aspects of the user interface shown in FIG. 1 can be embedded into the web pages of other sites such as social media sites. For example, video presentation 102 and buttons 124, 126, and 128 can be embedded into a social media site's web page, so that the video commentary system's server can receive submissions directly from those social media sites. In some embodiments of the invention, these and various other aspects and elements of the user interface and/or the comment bubble window can be embedded into various other web sites, regardless of the intent of those web sites. In one embodiment, the commentary system provides a control which, when activated, causes HTML code representing the comment bubble window, including the buttons, to be copied to the clipboard of the user's computing device so that the user can easily paste that HTML code into his own web page on his own web site.

In one embodiment of the invention, the user interface shown in FIG. 1 additionally contains a control that enables a user from the on-line community to share a submission that he made using the commentary system (e.g., by selecting one of buttons 124, 126, or 128, or by entering a textual, video, or audio submission through control 106) on various ones of his social media web pages. For example, after receiving a submission from a user, the video commentary system server can present an interface control that lists various social media sites and invites the user to "share" the submission that he just entered. In response to the user selecting one or more of the social media sites from the list, the video commentary system server can instruct the server of the selected social media sites to inject, onto the user's pages on those sites, entries (e.g., wall posts) that indicate that the user just entered a submission on the video commentary site. The entries can show, among other elements, a thumbnail of the video presentation relative to which the submission was entered, and some indication of the content of the submission itself In one embodiment of the invention, such entries also are or contain hyperlinks that will direct the browser of the selector thereof to the video commentary site web page that contains the comment submission interface for that specified video presentation.

In one embodiment, mechanisms are also provided for sharing a submission with selected social contacts gleaned through social media sites. For example, a user interface containing the video presentation and/or submission can contain a control labeled "share with friends." A user's selection of the link can cause messages to be sent to at least a subset of the user's contacts known from the social media site. In one embodiment, the user can be presented with a list of his contacts from which he can select the contacts to which the messages are to be sent. The messages can take the form of e-mail messages directed to the contacts' e-mail addresses, and/or postings made to the social media site web pages belonging to those contacts. Each such message can contain, for example, a thumbnail sample of the relevant video presentation, an indication of the content of the user's submission, and/or an invitation to view the video presentation by visiting the video commentary system site. A young athlete's parent might use such a feature, for example, to invite scholastic athletic program recruiters to view a video presentation of his child's athletic performance.

In one embodiment, the server keeps track of the users to whom such messages have been sent. The server can include, in the user interface in which the video presentation is displayed, a control through which viewers can obtain a list of users to whom the messages were sent—the list of friends with whom the video presentation has been shared. A viewer can use this information to decide whether to allow other viewers of the video presentation to see the submissions that he posts relative to the video presentation.

In one embodiment, the server provides a mechanism whereby a potential user's social media site account (e.g., Facebook, Twitter, Google+, etc.) can be linked to the user's commentary system account either at registration or at a subsequent time. In one embodiment, the linking of the user's social media site account to the user's commentary system account enables the user to access his commentary system account alter authenticating with his linked social media site account while avoiding the need to re-authenticate with the commentary system account (i.e., single-sign on functionality). In one embodiment, the user can give consent to the commentary system to read the user's attribute information from the social media site and use that attribute information for various purposes (e.g., assignment to demographic categories).

In one embodiment, each user can be required to log-in to the commentary system by providing a username and password. In an alternative embodiment, a user can authenticate with the commentary system by accessing the system from an e-mail domain that is recognized by the system. For example, in one embodiment, a school or other organization can pay the operator of the commentary system for the privilege of having users belonging to its e-mail domain granted access to the commentary system. In response to such an arrangement, the server of the commentary system can send out e-mail invitations to e-mail addresses belonging to the specified e-mail domain. Each such invitation can contain a link that can be used by the invitation recipient to access the commentary system without supplying a password as part of an authentication process.

As is discussed above, in various embodiments of the invention, various invitations can be sent to users for various purposes, such as, for example, to view a video presentation or to register with the commentary system. In one embodiment of the invention, any of all such invitations can be sent in the form of "tweets" made to users' Twitter accounts. In one embodiment of the invention, in response to certain kinds of invitations being made, a tweet describing that invitation, and potentially identifying the invitee and/or inviter, can be broadcasted to one or more Twitter users' accounts. In one embodiment of the invention, the commentary system provides special account designations to notable or famous commentary system users such as celebrities, professional athletes, politicians, etc. The commentary system can cause a tweet to be broadcasted to one or more Twitter users' accounts in response to such a specially designated user posting a submission relative to a video presentation. That tweet can identify the user as well as the content of his submission. Such a tweet can be broadcasted from the specially designated user's own Twitter account, provided that the user has consented to allow the commentary system to make tweets from his Twitter account. In one embodiment, tweets are broadcasted only to Twitter users who have specified their Twitter account identifiers in their commentary system account profile information, and/or only to users who have elected to subscribe to such tweets. Such tweets can include a snippet of the video presentation to which they pertain, such as a video snippet that begins at the time point to which the tweeted submission pertains, and that lasts for a specified duration (e.g., 5 seconds). Such tweets can include hyperlinks to the web page containing the video presentation and/or hyperlinks to a web page through which users can register new accounts with the commentary system.

Tracking Popular and Related Submission Categories

As is discussed above, in one embodiment of the invention, categorized submission buttons, such as buttons 124, 126, and 128, can be customized by the video presentation provider. The categories, or labels, for these buttons can be specified through control 312 of the interface shown in FIG. 3, for example. In one embodiment of the invention, each time that a set of categories is specified in this way, the server increments a stored tally for each such category. If it is the first time that a particular category has been specified, then the server can initialize a new stored tally for that particular category. In this manner, the server can keep track of which specified categories are the most popular. The popular categories may be indicative of the kinds of qualities about which video presentation providers tend to be the most concerned regarding the contents of their video presentations. In one embodiment, for each specified set of categories, the server also stores data that maps the categories in that set to each other. In this manner, the server can keep track of which categories tend to be specified most often in the same sets as other categories.

The server can use such category tracking data in various ways. For example, in the user interface of FIG. 3, the server can show a "cloud" of categories from which the user can select to specify the categories using control 312. Within the cloud, categories that are more popular can appear in a larger font size, while categories that are less popular can appear in a smaller font size. Additionally or alternatively, the category tracking data can be used to auto-complete the typing of categories within the field of control 312. Additionally or alternatively, the category tracking data can be used to suggest additional oft-related categories after the user has specified a category using control 312.

In one embodiment, instead of or in addition to a title for a video presentation, the user interface permits the video presentation provider to specify a textual goal—something that the provider hopes to achieve by receiving feedback in the form of submissions. In such an embodiment, the server can store associations between such goals and the sets of categories that are specified in connection with such goals. The server can use such data to determine, for each goal, the categories that tend to be most popular within sets of categories specified by various users for that goal. Thereafter, in response to a video presentation provider specifying a goal for his video presentation, the server can recommend one or more of the most popular goals that have been associated with that same goal by other providers in the past.

Example Flow

Figure 5:
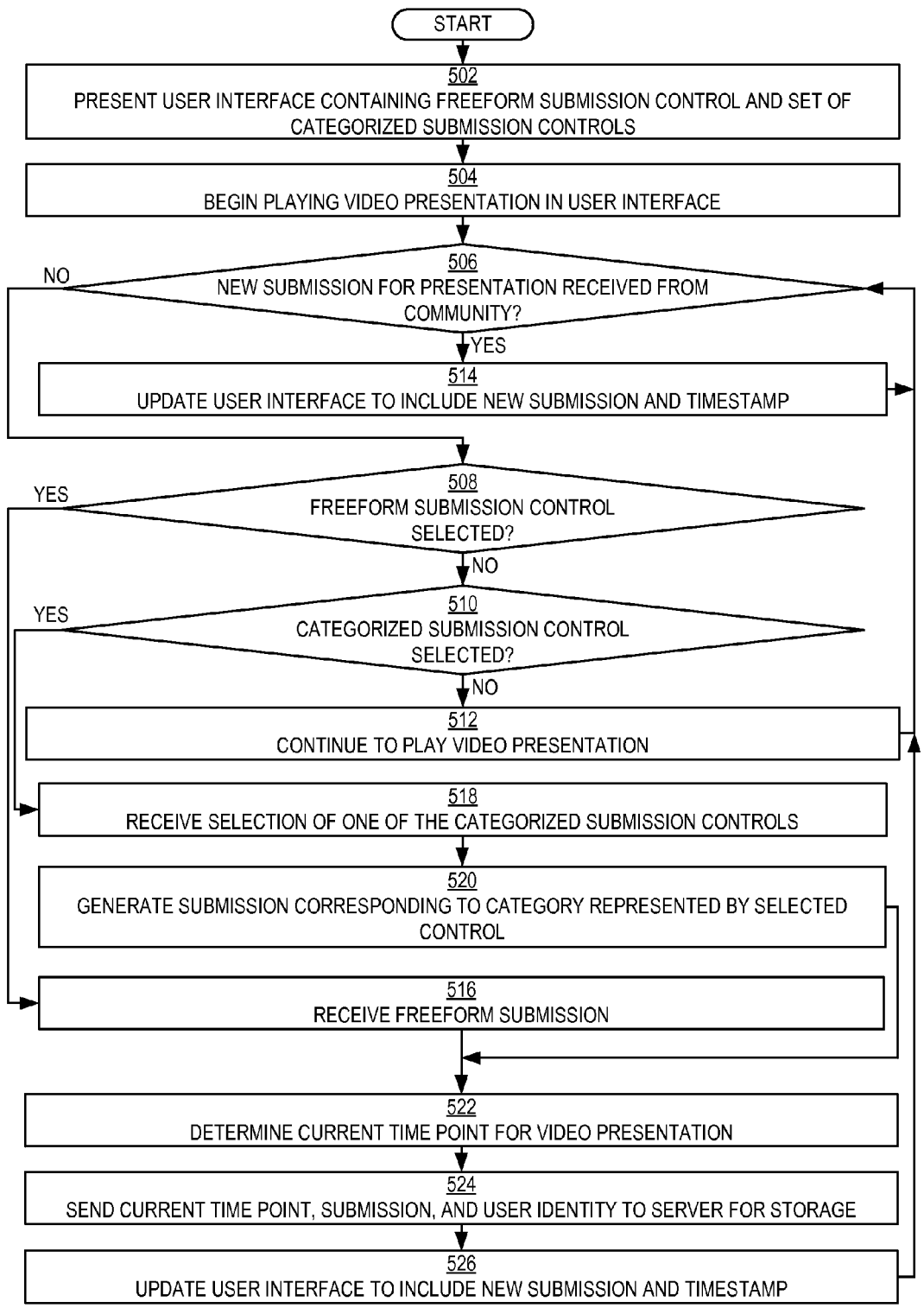
FIG. 5 is a flow diagram that illustrates a technique through which a submission can be associated with a current time point in a video presentation, according to an embodiment of the invention.

FIG. 5 is a flow diagram that illustrates a technique through which a submission can be associated with a current time point in a video presentation, according to an embodiment of the invention. Although certain operations are illustrated in FIG. 5, alternative embodiments of the invention can involve more, fewer, or different steps than those shown by way of example. In block 502, a computing device presents a user interface that contains a freeform submission control and a set of categorized submission controls. In block 504, the device begins playing a video presentation in the user interface.

In block 506, the device determines whether a new submission for the video presentation has been received from any user in an on-line community. For example, the device can receive data over the Internet from a server indicating that a new submission for the video presentation has been received at the server. If a new submission for the video presentation has been received, then control passes to block 514. Otherwise, control passes to block 508.

In block 508, the device determines whether the device's user has selected the freeform submission control. If so, then control passes to block 516. Otherwise, control passes to block 510.

In block 510, the device determines whether the device's user has selected any of the categorized submission controls. If so, then control passes to block 518. Otherwise, control passes to block 512.

In block 512, the device continues to play the video presentation. Control passes back to block 506.

In block 514, the device updates the user interface to include the new submission and, potentially, the timestamp specifying the video presentation time point to which the new submission pertains. This may include adding a textual, video, or audio comment to a comment region of the user interface if the submission was made using the freeform submission control. This may alternative include refreshing a categorized submission bar graph if the submission was made using one of the categorized submission controls. Control passes back to block 506.

In block 516, the device receives a freeform submission through the user interface. This can include receiving typed text or recording video or audio content through the device's input subsystems. Control passes to block 522.

In block 518, the device receives a selection of one of the categorized submission controls through the user interface. In block 520, the device generates a submission that corresponds to the category that the categorized submission control represents. Control passes to block 522.

In block 522, the device determines a current time point corresponding to a frame of the video presentation that is currently being shown in the user interface. In block 524, the device sends the current time point, the submission, and the user's identity over the Internet to the server. The server can responsively store a mapping between these information items, and can push the new submission over the Internet to other computing devices. In block 526, the device updates the user interface to include the new submission and, potentially, the timestamp specifying the video presentation time point to which the new submission pertains. This may include adding a textual, video, or audio comment to a comment region of the user interface if the submission was made using the freeform submission control. This may alternative include refreshing a categorized submission bar graph if the submission was made using one of the categorized submission controls. Control passes back to block 506.

Hardware Overview

Figure 6:
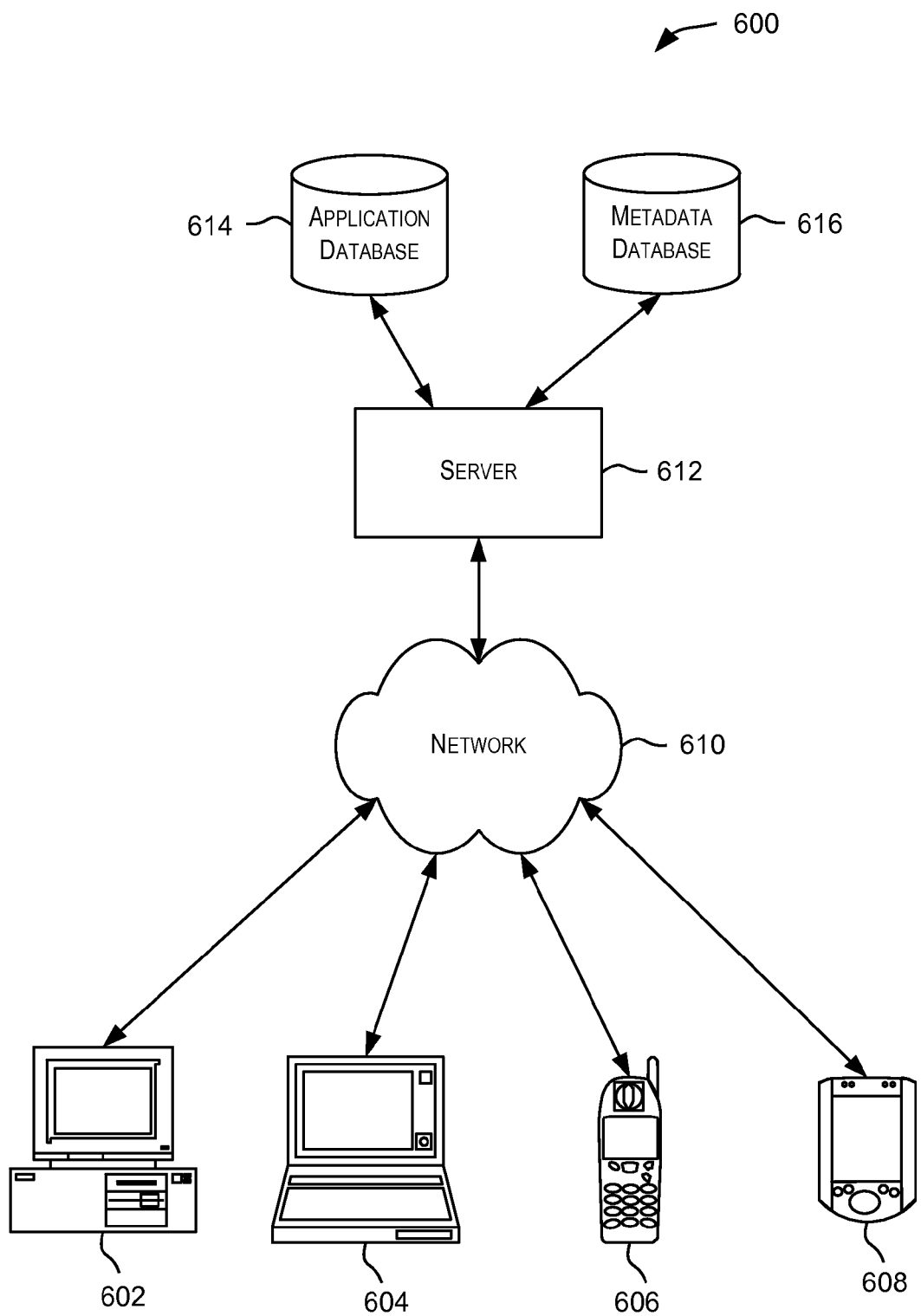
FIG. 6 is a simplified block diagram illustrating components of a system environment that may be used in accordance with an embodiment of the present invention.

FIG. 6 is a simplified block diagram illustrating components of a system environment 600 that may be used in accordance with an embodiment of the present invention. As shown, system environment 600 includes one or more client computing devices 602, 604, 606, 608, which are configured to operate client applications including native client applications and possibly other applications such as a web browser, or the like. In various embodiments, client computing devices 602, 604, 606, and 608 may interact with a server 612.

Client computing devices 602, 604, 606, 608 may be general purpose personal computers (including, by way of example, personal computers and/or laptop computers running various versions of Microsoft Windows and/or Apple Macintosh operating systems cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602, 604, 606, and 608 may be any other electronic device, such as a thin-client computer, Internet-enabled gaming system, and/or personal messaging device, capable of communicating over a network (e.g., network 610 described below). Although exemplary system environment 600 is shown with four client computing devices, any number of client computing devices may be supported. Other devices such as devices with sensors, etc. may interact with server 612.

System environment 600 may include a network 610. Network 610 may be any type of network familiar to those skilled in the art that can support data communications using; any of a variety of commercially-available protocols, including without limitation TCPIP, SNA, IPX, AppleTalk, and the like. Merely by way of example, network 610 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 702.11 suite of protocols, the Bluetooth protocol known in the art, and/or any other wireless protocol); and/or any combination of these and/or other networks.

System environment 600 also includes one or more server computers 612 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 612 may be adapted to run one or more services or software applications.

Server 612 may run an operating system including any of those discussed above, as well as any commercially available server operating system. Server 612 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 600 may also include one or more databases 614, 616. Databases 614, 616 may reside in a variety of locations. By way of example, one or more of databases 614, 616 may reside on a non-transitory storage medium local to (and/or resident in) server 612. Alternatively, databases 614, 616 may be remote from server 612, and in communication with server 612 via a network-based or dedicated connection. In one set of embodiments, databases 614, 616 may reside in a storage-area network (SAN) familiar to those skilled in the art. Similarly, any necessary files for performing the functions attributed to server 612 may be stored locally on server 612 and/or remotely, as appropriate. In one set of embodiments, databases 614, 616 may include relational databases that are adapted to store, update, and retrieve data in response to SQL-formatted commands.

Figure 7:
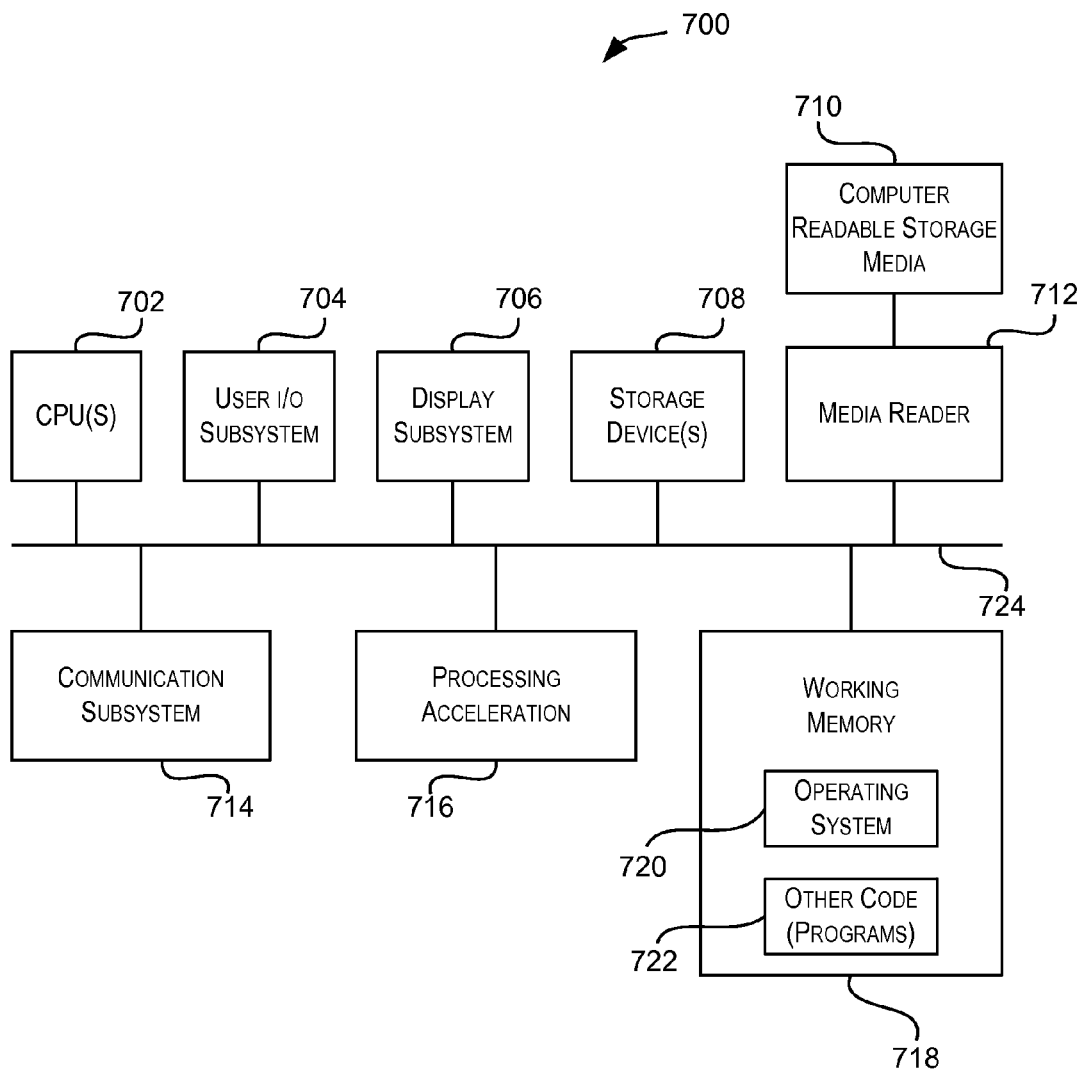
FIG. 7 is a simplified block diagram of a computer system that may be used in accordance with embodiments of the present invention.

FIG. 7 is a simplified block diagram of a computer system 700 that may be used in accordance with embodiments of the present invention. For example server 612 or clients 602, 604, 606, or 608 may be implemented using a system such as system 700. Computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). Computer system 700 may also include one or more storage devices 708. By way of example, the storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with network 610 and/or any other computer described above with respect to system environment 600.

Computer system 700 may also comprise software elements, shown as being currently located within working memory 718, including an operating system 720 and/or other code 722, such as an application program (which may be a client application, Web browser, mid-tier application, RDBMS, etc.). In an exemplary embodiment, working memory 718 may include executable code and associated data structures used for a collaborative real-time on-line timestamped-commentary video content system as described above. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer-readable instructions, data structures, program modules, or other data., including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
   presenting, on a web page, a text entry field for a text string to be entered by a user;
   receiving the text string, the text string including a delimited label list;
   parsing the delimited label list to determine a number of, and labels for, categorized user-selectable interface elements to display;
   presenting a graphical interface that includes a motion video presentation and the number of categorized user-selectable interface elements, each user-selectable interface element having a separate label from the delimited label list;
   receiving, through the graphical interface, at a first moment during the presentation, a first selection of a first interface element of the categorized interface elements;
   in response to receiving the first selection, storing first data that maps a first category, corresponding to the first interface element, to a first time point at which the motion video presentation was being presented at the first moment; and
   generating, based at least in part on the first data, a first tracking graphical element that indicates at least a first quantity of times that the first interface element has been selected during a first time interval that includes the first time point.

2. The computer-implemented method of claim 1, further comprising:
   receiving, through the graphical interface, at a second moment during the presentation, a second selection of a second interface element of the plurality of interface elements;
   in response to receiving the second selection, storing second data that maps a second category, corresponding to the second interface element but not the first interface element, to a second time point at which the motion video was being presented at the second moment; and
   generating, based at least in part on the first data and the second data, a second tracking graphical element that indicates at least (a) the first quantity of times that the first interface element has been selected during the first time interval that includes the first time point and (b) a second quantity of times that the second interface element has been selected during a second time interval that includes the second time point but not the first time point.

3. The computer-implemented method of claim 2, wherein the first interface element is a first color; wherein the second interface element is a second color that differs from the first color; wherein the second tracking graphical element includes a first quantity indicator that is the first color and that indicates the first quantity; and wherein the second tracking graphical element includes a second quantity indicator that is the second color and that indicates the second quantity.

4. The computer-implemented method of claim 2, wherein receiving the first selection comprises receiving the first selection over a network from a first computing device; and wherein receiving the second selection comprises receiving the second selection over a network from a second computing device that is separate from the first computing device.

5. The computer-implemented method of claim 2, further comprising:
   in response to generating the second tracking graphical element, sending data representing the second tracking graphical element over a network to a first computing device that is presenting the graphical interface; and
   in response to generating the second tracking graphical element, sending data representing the second tracking graphical element over a network to a second computing device that is separate from the first computing device and that is also presenting the graphical interface.

6. The computer-implemented method of claim 2 further comprising:
   determining that the first data that maps the first category is below a threshold and that the second data that maps the second category is above the threshold;
   skipping over a first portion of the motion video presentation based on the determination; and
   playing a second portion of the motion video presentation at the second time point based on the determination.

7. The computer-implemented method of claim 1, further comprising:
   generating web page data that represents a web page that includes a user interface containing both the motion video presentation and the first graphical tracking element; and
   sending the web page data over a network to a plurality of computing devices.

8. The computer-implemented method of claim 1, further comprising:
   receiving a first textual comment through the graphical interface at a second moment during the presentation;
   in response to receiving the first textual comment, storing second data that maps the first textual comment to a second time point at which the motion video was being presented at the second moment; and
   updating the user interface to include both the first textual comment and a first timestamp that indicates that the first textual comment pertains to the second time point.

9. The computer-implemented method of claim 8, further comprising:
   receiving a second textual comment through the graphical interface at a third moment during the presentation;
   in response to receiving the second textual comment, storing third data that maps the second textual comment to a third time point at which the motion video was being presented at the third moment; and updating the user interface to include the first textual comment, the second textual comment, the first timestamp, and a second timestamp that indicates that the second textual comment pertains to the third time point.

10. The computer-implemented method of claim 1, further comprising:
receiving, through the graphical interface, at a second moment during the presentation, a second selection of the first interface element;
in response to receiving the second selection, storing second data that maps the first category to a second time point at which the motion video was being presented at the second moment;
determining that both the first time point and the second time point occur within the first time interval;
in response to determining that both the first time point and the second time point occur within the first time interval, incrementing the first quantity; and
after incrementing the first quantity, generating, based at least in part on the first data and the second data, a second tracking graphical element that indicates the first quantity of times that the first interface element has been selected during the first time interval that includes both the first time point and the second time point.

11. The computer-implemented method of claim 1 further comprising:
associating a positive-to-negative weight with each user-selectable interface element, the positive-to-negative weights designated by the user who enters the text string; and
calculating a total score based on the weights.

12. The computer-implemented method of claim 1 further comprising:
assigning a color to each user-selectable interface element from the user who entered the text string.

13. A non-transitory computer-readable storage medium storing instructions which, when executed by one or more processors, cause the processors to perform operations comprising:
presenting, on a web page, a text entry field for a text string to be entered by a user;
receiving the text string, the text string including a delimited label list;
parsing the delimited label list to determine a number of, and labels for, categorized user-selectable interface elements to display;
presenting a graphical interface that includes a motion video presentation and the number of categorized user-selectable interface elements, each user-selectable interface element having a separate label from the delimited label list;
receiving, through the graphical interface, at a first moment during the presentation, a first selection of a first interface element of the categorized interface elements;
in response to receiving the first selection, storing first data that maps a first category, corresponding to the first interface element, to a first time point at which the motion video presentation was being presented at the first moment; and
generating, based at least in part on the first data, a first tracking graphical element that indicates at least a first quantity of times that the first interface element has been selected during a first time interval that includes the first time point.

14. The non-transitory computer-readable storage medium of claim 13, wherein the operations further comprise:

receiving, through the graphical interface, at a second moment during the presentation, a second selection of a second interface element of the plurality of interface elements;
in response to receiving the second selection, storing second data that maps a second category, corresponding to the second interface element but not the first interface element, to a second time point at which the motion video was being presented at the second moment; and
generating, based at least in part on the first data and the second data, a second tracking graphical element that indicates at least (a) the first quantity of times that the first interface element has been selected during the first time interval that includes the first time point and (b) a second quantity of times that the second interface element has been selected during a second time interval that includes the second time point but not the first time point;
wherein the first interface element is a first color;
wherein the second interface element is a second color that differs from the first color:
wherein the second tracking graphical element includes a first quantity indicator that is the first color and that indicates the first quantity;
wherein the second tracking graphical element includes a second quantity indicator that is the second color and that indicates the second quantity;
wherein the second tracking graphical element is a bar chart;
wherein the first quantity indicator is a bar, in the bar chart, having a size that is based on the first quantity;
wherein the second quantity indicator is a bar, in the bar chart, having a size that is based on the second quantity;
wherein the first interface element is a first button having a first label; and
wherein the second interface element is a second button having a second label that differs from the first label.

15. The non-transitory computer-readable storage medium of claim 13, wherein the operations further comprise:
receiving, through the graphical interface, at a second moment during the presentation, a second selection of a second interface element of the plurality of interface elements;
in response to receiving the second selection, storing second data that maps a second category, corresponding to the second interface element but not the first interface element, to a second time point at which the motion video was being presented at the second moment;
generating, based at least in part on the first data and the second data, a second tracking graphical element that indicates at least (a) the first quantity of times that the first interface element has been selected during the first time interval that includes the first time point and (b) a second quantity of times that the second interface element has been selected during a second time interval that includes the second time point but not the first time point;
receiving a first textual comment through the graphical interface at a second moment during the presentation;
in response to receiving the first textual comment, storing second data that maps the first textual comment to a second time point at which the motion video was being presented at the second moment;
updating the user interface to include both the first textual comment and a first timestamp that indicates that the first textual comment pertains to the second time point;

receiving a second textual comment through the graphical interface at a third moment during the presentation;
in response to receiving the second textual comment, storing third data that maps the second textual comment to a third time point at which the motion video was being presented at the third moment; and
updating the user interface to include the first textual comment, the second textual comment, the first timestamp, and a second timestamp that indicates that the second textual comment pertains to the third time point.

16. The non-transitory computer-readable storage medium of claim 13, wherein the operations further comprise:
receiving, through the graphical interface, at a second moment during the presentation, a second selection of the first interface element;
in response to receiving the second selection, storing second data that maps the first category to a second time point at which the motion video was being presented at the second moment; and
generating, based at least in part on the first data and the second data, a second tracking graphical element that indicates at least (a) the first quantity of times that the first interface element has been selected during the first time interval that includes the first time point and (b) a second quantity of times that the first interface element has been selected during a second time interval that includes the second time point but not the first time point.

17. A system comprising:
one or more processors; and
a non-transitory computer-readable storage memory storing instructions for causing the one or more processors to:
presenting, on a web page, a text entry field for a text string to be entered by a user;
receiving the text string, the text string including a delimited label list;
parsing the delimited label list to determine a number of, and labels for, categorized user-selectable interface elements to display;
present a graphical interface that includes a motion video presentation and the number of categorized user-selectable interface elements, each user-selectable interface element having a separate label from the delimited label list;
receive, through the graphical interface, at a first moment during the presentation, a first selection of a first interface element of the categorized interface elements;
store, in response to receiving the first selection, first data that maps a first category, corresponding to the first interface element, to a first time point at which the motion video presentation was being presented at the first moment; and
generate, based at least in part on the first data, a first tracking graphical element that indicates at least a first quantity of times that the first interface element has been selected during a first time interval that includes the first time point.

18. The system of claim 17, wherein non-transitory computer-readable storage memory stores instructions for causing the one or more processors to:
receive, through the graphical interface, at a second moment during the presentation, a second selection of a second interface element of the plurality of interface elements;
store, in response to receiving the second selection, second data that maps a second category, corresponding to the second interface element but not the first interface element, to a second time point at which the motion video was being presented at the second moment; and
generate, based at least in part on the first data and the second data, a second tracking graphical element that indicates at least (a) the first quantity of times that the first interface element has been selected during the first time interval that includes the first time point and (b) a second quantity of times that the second interface element has been selected during a second time interval that includes the second time point but not the first time point;
wherein the first interface element is a first color;
wherein the second interface element is a second color that differs from the first color;
wherein the second tracking graphical element includes a first quantity indicator that is the first color and that indicates the first quantity;
wherein the second tracking graphical element includes a second quantity indicator that is the second color and that indicates the second quantity;
wherein the second tracking graphical element is a bar chart;
wherein the first quantity indicator is a bar, in the bar chart, having a size that is based on the first quantity;
wherein the second quantity indicator is a bar, in the bar chart, having a size that is based on the second quantity;
wherein the first interface element is a first button having a first label; and
wherein the second interface element is a second button having a second label that differs from the first label.

19. The system of claim 17, wherein non-transitory computer-readable storage memory stores instructions for causing the one or more processors to:
receive, through the graphical interface, at a second moment during the presentation, a second selection of a second interface element of the plurality of interface elements;
store, in response to receiving the second selection, second data that maps a second category, corresponding to the second interface element but not the first interface element, to a second time point at which the motion video was being presented at the second moment;
generate, based at least in part on the first data and the second data, a second tracking graphical element that indicates at least (a) the first quantity of times that the first interface element has been selected during the first time interval that includes the first time point and (b) a second quantity of times that the second interface element has been selected during a second time interval that includes the second time point but not the first time point;
receive a first textual comment through the graphical interface at a second moment during the presentation;
store, in response to receiving the first textual comment, second data that maps the first textual comment to a second time point at which the motion video was being presented at the second moment;
update the user interface to include both the first textual comment and a first timestamp that indicates that the first textual comment pertains to the second time point;
receive a second textual comment through the graphical interface at a third moment during the presentation;
store, in response to receiving the second textual comment, third data that maps the second textual comment to a third time point at which the motion video was being presented at the third moment; and update the user interface to include the first textual comment, the second textual comment, the first timestamp, and a second timestamp that indicates that the second textual comment pertains to the third time point.

20. The system of claim 17, wherein non-transitory computer-readable storage memory stores instructions for causing the one or more processors to:

receive, through the graphical interface, at a second moment during the presentation, a second selection of the first interface element;

store, in response to receiving the second selection, second data that maps the first category to a second time point at which the motion video was being presented at the second moment; and generate, based at least in part on the first data and the second data, a second tracking graphical element that indicates at least (a) the first quantity of times that the first interface element has been selected during the first time interval that includes the first time point and (b) a second quantity of times that the first interface element has been selected during a second time interval that includes the second time point but not the first time point.

\* \* \* \* \*